(12) United States Patent
Amano et al.

(10) Patent No.: US 8,938,528 B2
(45) Date of Patent: Jan. 20, 2015

(54) COMPUTER SYSTEM, AND METHOD FOR MANAGING RESOURCE POOL INFORMATION

(75) Inventors: Takashi Amano, Yokohama (JP);
Akihisa Nagami, Yokohama (JP);
Yasunori Kaneda, Yokohama (JP);
Noriko Nakajima, Machida (JP)

(73) Assignee: Hitachi, Ltd., Tokyo (JP)

( * ) Notice: Subject to any disclaimer, the term of this patent is extended or adjusted under 35 U.S.C. 154(b) by 613 days.

(21) Appl. No.: 13/320,799

(22) PCT Filed: Nov. 8, 2011

(86) PCT No.: PCT/JP2011/006238
§ 371 (c)(1),
(2), (4) Date: Nov. 16, 2011

(87) PCT Pub. No.: WO2013/069051
PCT Pub. Date: May 16, 2013

(65) Prior Publication Data
US 2013/0117427 A1    May 9, 2013

(51) Int. Cl.
*G06F 15/173* (2006.01)
*G06F 9/44* (2006.01)
*H04L 29/08* (2006.01)
*H04L 29/12* (2006.01)

(52) U.S. Cl.
CPC .......... *G06F 9/4416* (2013.01); *H04L 67/1097* (2013.01); *H04L 61/6045* (2013.01); *H04L 29/12207* (2013.01); *H04L 61/20* (2013.01)
USPC ....................................................... 709/223

(58) Field of Classification Search
CPC ................ H04L 61/20; H04L 61/6045; H04L 29/12207; H04L 29/12886; H04L 43/0811; G06F 9/4416

USPC ......................................................... 709/223
See application file for complete search history.

(56) References Cited

U.S. PATENT DOCUMENTS

| 7,379,990 | B2 * | 5/2008 | Tsao ............................. 709/223 |
| 7,783,727 | B1 | 8/2010 | Foley et al. |
| 2006/0173912 | A1 * | 8/2006 | Lindvall et al. ............ 707/104.1 |
| 2007/0192466 | A1 * | 8/2007 | Nahum ......................... 709/223 |
| 2010/0100760 | A1 * | 4/2010 | Goto et al. ......................... 714/3 |
| 2010/0191946 | A1 * | 7/2010 | Cheston et al. .................. 713/2 |

OTHER PUBLICATIONS

Brisse et al, "Understanding Boot-From-San Technology", White Paper, 2005, pp. 1-8, Dell.

* cited by examiner

*Primary Examiner* — Larry Donaghue
(74) *Attorney, Agent, or Firm* — Volpe and Koenig, P.C.

(57) ABSTRACT

A computer system is provided that is capable of reducing an administrator's operational errors by connecting a new server to a SAN and automating a SAN boot setting, and capable of lightening the administrator's task of checking for a wrong connection by detecting a wrong connection made when a new server is connected to an SNW connection device. Once a new server connected to a PnP SAN starts with a boot program obtained from a boot management server, the new server transmits configuration information on the new server to a resource management server. In response to a request from the resource management server, a storage device refers to PnP SAN information to transmit SAN information on a storage network connection device to which the new server is connected. The resource management server determines to add the new server to a resource group on the basis of the SAN information and requirement information. The resource management server sets the storage device and the new server for SAN-booting the new server.

8 Claims, 27 Drawing Sheets

Fig. 3

| Use status 300 | WWN 301 | MAC address 302 | IP address 303 | CPU virtualization function 304 | Memory capacity 305 | The number of CPU cores 306 | |
|---|---|---|---|---|---|---|---|
| Yes | XX:XX:XX:XX:XX:XX:XX:A1 | XX-XX-XX-XX-XX-A1 | 192.168.100.100 | Yes | 24 GB | 8 | |
| Yes | XX:XX:XX:XX:XX:XX:XX:B1 | XX-XX-XX-XX-XX-B1 | 192.168.100.101 | Yes | 48 GB | 16 | |
| ... | ... | ... | ... | ... | ... | ... | |
| No | XX:XX:XX:XX:XX:XX:XX:77 | XX-XX-XX-XX-XX-77 | 192.168.100.177 | Yes | 24 GB | 8 | |

| CPU virtualization function | Memory capacity | The number of CPU cores | The number of HBAs | The number of NICs | The number of internal HDDs | Vendor name | Model number |
|---|---|---|---|---|---|---|---|
| Yes | 24 GB | 8 | 1 | 1 | 0 | Vendor-abcdef | Server-abcdef |

400 401 402 403 404 405 406 407

202

| Use status | IP address |
|---|---|
| Yes | 192.168.100.100 |
| Yes | 192.168.100.101 |
| Yes | 192.168.100.102 |
| Yes | 192.168.100.103 |
| No | 192.168.100.104 |
| ... | ... |
| No | 192.168.100.199 |

| Boot order | Device |
|---|---|
| 1 | CDROM |
| 2 | USB HDD |
| 3 | Other USB |
| 4 | SAN |
| 5 | PXE |
| 6 | HDD |

Fig. 10

| Order | WWN | Host LUN |
|---|---|---|
| 1 | XX:XX:XX:XX:XX:XX:FF:70 | 0 |
| 2 | (null) | (null) |

Fig. 12

| SW ID | SW port ID | WWN of SW port | Type | WWN |
|---|---|---|---|---|
| 0 | 0 | xx:xx:xx:xx:xx:xx:00 | (null) | (null) |
| 0 | 1 | xx:xx:xx:xx:xx:xx:01 | Initiator | xx:xx:xx:xx:xx:xx:A1 |
| 0 | 2 | xx:xx:xx:xx:xx:xx:02 | (null) | (null) |
| 0 | 3 | xx:xx:xx:xx:xx:xx:03 | (null) | (null) |
| 0 | 4 | xx:xx:xx:xx:xx:xx:04 | (null) | (null) |
| 0 | 5 | xx:xx:xx:xx:xx:xx:05 | Target | xx:xx:xx:xx:xx:FF:70 |
| 1 | 0 | xx:xx:xx:xx:xx:xx:10 | (null) | (null) |
| 1 | 1 | xx:xx:xx:xx:xx:xx:11 | Initiator | xx:xx:xx:xx:xx:xx:B1 |
| 1 | 2 | xx:xx:xx:xx:xx:xx:12 | (null) | (null) |
| 1 | 3 | xx:xx:xx:xx:xx:xx:13 | (null) | (null) |
| 1 | 4 | xx:xx:xx:xx:xx:xx:14 | (null) | (null) |
| 1 | 5 | xx:xx:xx:xx:xx:xx:15 | Target | xx:xx:xx:xx:xx:FF:71 |
| 2 | 0 | xx:xx:xx:xx:xx:xx:20 | Initiator | xx:xx:xx:xx:xx:xx:C0 |
| 2 | 1 | xx:xx:xx:xx:xx:xx:21 | Initiator | xx:xx:xx:xx:xx:xx:C1 |
| 2 | 2 | xx:xx:xx:xx:xx:xx:22 | (null) | (null) |
| 2 | 3 | xx:xx:xx:xx:xx:xx:23 | (null) | (null) |
| 2 | 4 | xx:xx:xx:xx:xx:xx:24 | (null) | (null) |
| 2 | 5 | xx:xx:xx:xx:xx:xx:25 | Target | xx:xx:xx:xx:xx:FF:77 |

Fig. 14

| PnP SAN | SW ID | SW port ID | WWN of SW port | Type | WWN |
|---|---|---|---|---|---|
| Yes | 0 | 0 | xx:xx:xx:xx:xx:00 | (null) | (null) |
| Yes | 0 | 1 | xx:xx:xx:xx:xx:01 | (null) | (null) |
| Yes | 0 | 2 | xx:xx:xx:xx:xx:02 | (null) | (null) |
| Yes | 0 | 3 | xx:xx:xx:xx:xx:03 | (null) | (null) |
| Yes | 0 | 4 | xx:xx:xx:xx:xx:04 | (null) | (null) |
| Yes | 0 | 5 | xx:xx:xx:xx:xx:05 | Target | xx:xx:xx:xx:xx:FF:70 |
| Yes | 1 | 0 | xx:xx:xx:xx:xx:10 | (null) | (null) |
| Yes | 1 | 1 | xx:xx:xx:xx:xx:11 | Initiator | xx:xx:xx:xx:xx:B1 |
| Yes | 1 | 2 | xx:xx:xx:xx:xx:12 | (null) | (null) |
| Yes | 1 | 3 | xx:xx:xx:xx:xx:13 | (null) | (null) |
| Yes | 1 | 4 | xx:xx:xx:xx:xx:14 | (null) | (null) |
| Yes | 1 | 5 | xx:xx:xx:xx:xx:15 | Target | xx:xx:xx:xx:xx:FF:71 |
| No | 2 | 0 | xx:xx:xx:xx:xx:20 | Initiator | xx:xx:xx:xx:xx:C0 |
| No | 2 | 1 | xx:xx:xx:xx:xx:21 | Initiator | xx:xx:xx:xx:xx:C1 |
| No | 2 | 2 | xx:xx:xx:xx:xx:22 | (null) | (null) |
| No | 2 | 3 | xx:xx:xx:xx:xx:23 | (null) | (null) |
| No | 2 | 4 | xx:xx:xx:xx:xx:24 | (null) | (null) |
| No | 2 | 5 | xx:xx:xx:xx:xx:25 | Target | xx:xx:xx:xx:xx:FF:77 |

Fig. 15

| P-VOL LUN | V-VOL LUN |
|---|---|
| D0 | E0 |
| D0 | E1 |
| D0 | E2 |
| D1 | F0 |
| D1 | F1 |
| D1 | F2 |

| WWN of SNW I/F | WWN of HBA | Host LUN | LUN |
|---|---|---|---|
| XX:XX:XX:XX:XX:XX:FF:70 | XX:XX:XX:XX:XX:XX:XX:A1 | 0 | E0 |
| XX:XX:XX:XX:XX:XX:FF:71 | XX:XX:XX:XX:XX:XX:XX:B1 | 0 | E1 |
| XX:XX:XX:XX:XX:XX:FF:77 | XX:XX:XX:XX:XX:XX:XX:C0 | 0 | E2 |
| XX:XX:XX:XX:XX:XX:FF:77 | XX:XX:XX:XX:XX:XX:XX:C1 | 0 | F1 |

| PnP SAN | SW ID | SW port ID | WWN of SW port |
|---|---|---|---|
| | 0 | 0 | xx:xx:xx:xx:xx:xx:xx:00 |
| | 0 | 1 | xx:xx:xx:xx:xx:xx:xx:01 |
| ✓ | 0 | 2 | xx:xx:xx:xx:xx:xx:xx:02 |
| | 0 | 3 | xx:xx:xx:xx:xx:xx:xx:03 |
| | 0 | 4 | xx:xx:xx:xx:xx:xx:xx:04 |
| | 0 | 5 | xx:xx:xx:xx:xx:xx:xx:05 |
| | 1 | 0 | xx:xx:xx:xx:xx:xx:xx:10 |
| | 1 | 1 | xx:xx:xx:xx:xx:xx:xx:11 |
| ✓ | 1 | 2 | xx:xx:xx:xx:xx:xx:xx:12 |
| | 1 | 3 | xx:xx:xx:xx:xx:xx:xx:13 |
| | 1 | 4 | xx:xx:xx:xx:xx:xx:xx:14 |
| | 1 | 5 | xx:xx:xx:xx:xx:xx:xx:15 |

OK   CANCEL

COMPUTER SYSTEM, AND METHOD FOR MANAGING RESOURCE POOL INFORMATION

TECHNICAL FIELD

The present invention relates to a computer system, and a method for managing resource pool information. For example, the present invention relates to a technique for connecting a new server to a SAN (Storage Area Network) having a storage device connected thereto, and SAN-booting the new server.

BACKGROUND ART

In a computer system, new servers may be introduced as appropriate to the operation situation. However, with the growth of the scale of the computer system, the amount of an administrator's operations for introducing new servers increases. The increase in the amount of the administrator's operations is likely to cause frequent operational errors. The frequent occurrence of the administrator's operational errors makes it difficult to provide a computer system of high reliability and availability. Therefore, reducing the administrator's operational errors is important.

According to the inventor's investigation, there is the following technique (a non-patent literature 1) as a conventional implemented technique that facilitates setup for a SAN boot (boot via SAN).

As preliminary settings, an administrator checks a MAC address and an HBA (Host Bus Adapter) WWN (World Wide Name) of a server to be newly introduced (hereinafter referred to as a new server) and determines a LUN (Logical Unit Number) to be used in a SAN (Storage Area Network) boot. The administrator further determines an IP address corresponding to the MAC address and registers this information with a DHCP server. The administrator further registers the WWN of the HBA and the LUN to be used in the SAN boot with a BSM (Boot SAN Manager) server. The new server includes an NIC (Network Interface Card) supporting PXE (Preboot Execution Environment). Then the administrator powers up the server. The PXE of the powered-up new server issues a DHCP (Dynamic Host Configuration Protocol) request to obtain a temporary IP address of the new server from the DHCP server. The new server issues a PXE request to the DHCP server to obtain an IP address of a PXE server and a file name of an NBP (Network Bootstrap Program) from the PXE server. The new server issues a TFTP (Trivial File Transfer Protocol) request to obtain the NBP from the PXE server. The new server starts with the NBP and issues a boot parameter request to the Boot SAN Manager (BSM) server to obtain a boot parameter from the BSM server. The new server sets the boot parameter for a BIOS (Basic Input/Output System) and the HBA, invalidates the PXE boot, and restarts. The new server can further SAN-boot according to the boot parameter.

Further, there is the following technique (a patent literature 1) as to a SAN-boot of a new server.

As a preliminary setting, an administrator registers an OS to be used in each new server with a management server in a manner that the OS is associated with a WWN. When a new server is connected to a SAN, the management server obtains the WWN of the new server from an FC switch. The management server also identifies the OS from the WWN. A storage device generates a copy of the OS to be used for a SAN boot. The FC switch sets a path so that the new server can access the OS. In this manner, the new server connected to the SAN can be set to be booted through the SAN boot.

CITATION LIST

Patent Literature

PTL 1: U.S. Pat. No. 7,783,727

Non Patent Literature

NPL 1: Dell Inc., Understanding Boot-from-SAN Technology, 2005, http://www.dell.com/downloads/global/vectors/2005_bfs.pdf

SUMMARY OF INVENTION

Technical Problem

Connecting a new server to a SAN (plug) and setting a SAN boot for the new server to become available (play) will be referred to as server plug and play (PnP). In the server plug and play in the above conventional techniques, the administrator needs to perform some operations for each server. For example, in introducing new servers, the administrator requires, for each of the new servers, information associated with the WWN stored in the HBA, and has to manually associate each new server with a storage device.

However, for a large-scale computer system, several tens or thousands of new servers are introduced at one time. As an increasing number of new servers are introduced, the administrator has to perform an enormous number of operations, and the administrator's operational errors increase. As a result, it becomes difficult to provide a computer system of high reliability and availability.

A performance-oriented computer system is designed such that operation-use servers connected to SNW (Storage Networking World) connection devices are separated from other servers such as management-use servers in order to achieve high performance. Therefore, it is desirable that application-specific servers be connected to specific SNW connection devices.

However, if the administrator's setting errors increase, wrong connections of servers with SNW connection devices can occur, and much time may be devoted to the task of checking for the wrong connections. Further, as servers have come to be used as a resource pool, it is often the case that servers are assigned when server resources are needed. There may be environments in which servers for management use and servers for server resources are connected to the same SAN, and there is a need to simplify the checking of wrong connections and the introduction of servers even in such environments.

The present invention has been made in the light of the above circumstances and provides a technique for reducing an administrator's operational errors by connecting a new server to a SAN and automating SAN boot setting.

Solution to Problem

To solve the above object, in the present invention, new servers to be plug-and-played are grouped and managed as a resource group. An administrator sets, in advance or as appropriate to the operation situation, a dedicated group of storage network connection devices (hereinafter referred to as a PnP SAN) to which the new servers to be plug-and-played are connected. The administrator also sets requirement information about configuration requirements on servers to be added to the resource group. Once a new server connected to the PnP SAN starts with a boot program obtained from a boot management server, the new server transmits configuration information on the new server to a resource management server. In response to a request from the resource management server, a storage device refers to PnP SAN information to transmit SAN information on a storage network connection device (hereinafter referred to as an SNW connection device) to which the new server is connected. The resource management server determines to add the new server to the resource group on the basis of the SAN information and the requirement information. The resource management server sets the storage device and the new server for SAN-booting the new server.

In another embodiment, once the new server connected to the PnP SAN starts, the new server searches for a logical unit (hereinafter referred to as an LU) in the storage device in order to SAN-boot. The storage device generates the LU on the basis of SAN information of a switch obtained from the SNW connection device. The new server SAN-boots with the retrieved LU and transmits the configuration information to the resource management server. The resource management server determines to add the new server to the resource group on the basis of the requirement information and the configuration information. The resource management server sets the storage device and the new server for SAN-booting the new server.

That is, a computer system (a storage system) according to the present invention includes: a plurality of computers; a resource management computer that manages configuration information on the computers; a storage subsystem (a storage device) for storing data; a LAN that connects the plurality of computers with each other and connects the plurality of computers with the storage subsystem; and a plurality of SNW connection devices that connect at least one of the plurality of computers with the storage subsystem via a SAN. At least one of the SNW connection devices operates as a PnP SAN connection device for executing a SAN boot. A first computer connected to the PnP SAN connection device transmits the configuration information on the first computer to the resource management computer. The storage subsystem obtains property information on the PNP SAN connection device with reference to SAN type information for managing information on computers connected to the plurality of SNW connection devices, and transmits the property information to the resource management computer. The resource management computer determines whether or not to set the first computer as a target to execute the SAN boot, on the basis of information on a configuration requirement required for a computer to be a target to execute the SAN boot, the property information, and the configuration information. According to the result of the determination, the resource management computer manages the first computer as a target to execute the SAN boot and presents information on the target to execute the SAN boot.

Further features of the present invention will become apparent from the description in this specification and appended drawings. Aspects of the present invention are accomplished and implemented with elements and various combinations of the elements, and modes in the following detailed description and appended claims.

It is to be understood that the description in this specification is merely typical illustration and is not intended to limit the claims or applications of the present invention in any sense.

Advantageous Effects of Invention

According to the present invention, an administrator's operational errors can be reduced by connecting a new server to a SAN and automating SAN boot setting.

BRIEF DESCRIPTION OF DRAWINGS

FIG. 3 is a diagram showing an exemplary configuration of a resource pool management table of the resource management server.

FIG. 4 is a diagram showing an exemplary configuration of a resource requirement management table of the resource management server.

FIG. 9B is a diagram showing an exemplary configuration of the boot order management table (after being modified) for the motherboard according to the first embodiment and the boot order management table for the motherboard according to a second embodiment.

FIG. 10 is a diagram showing an exemplary configuration of a SAN boot management table for an HBA.

FIG. 12 is a diagram showing an exemplary configuration of a fabric management table of the SNW connection device.

FIG. 14 is a diagram showing an exemplary configuration of a PnP SAN management table of the storage device.

FIG. 15 is a diagram showing an exemplary configuration of a LUN management table of the storage device.

FIG. 16 is a diagram showing an exemplary configuration of a path management table of the storage device.

FIG. 22 is a diagram showing an exemplary configuration of a PnP SAN setting screen of the PnP management program according to the first embodiment.

DESCRIPTION OF EMBODIMENTS

Figure 1:
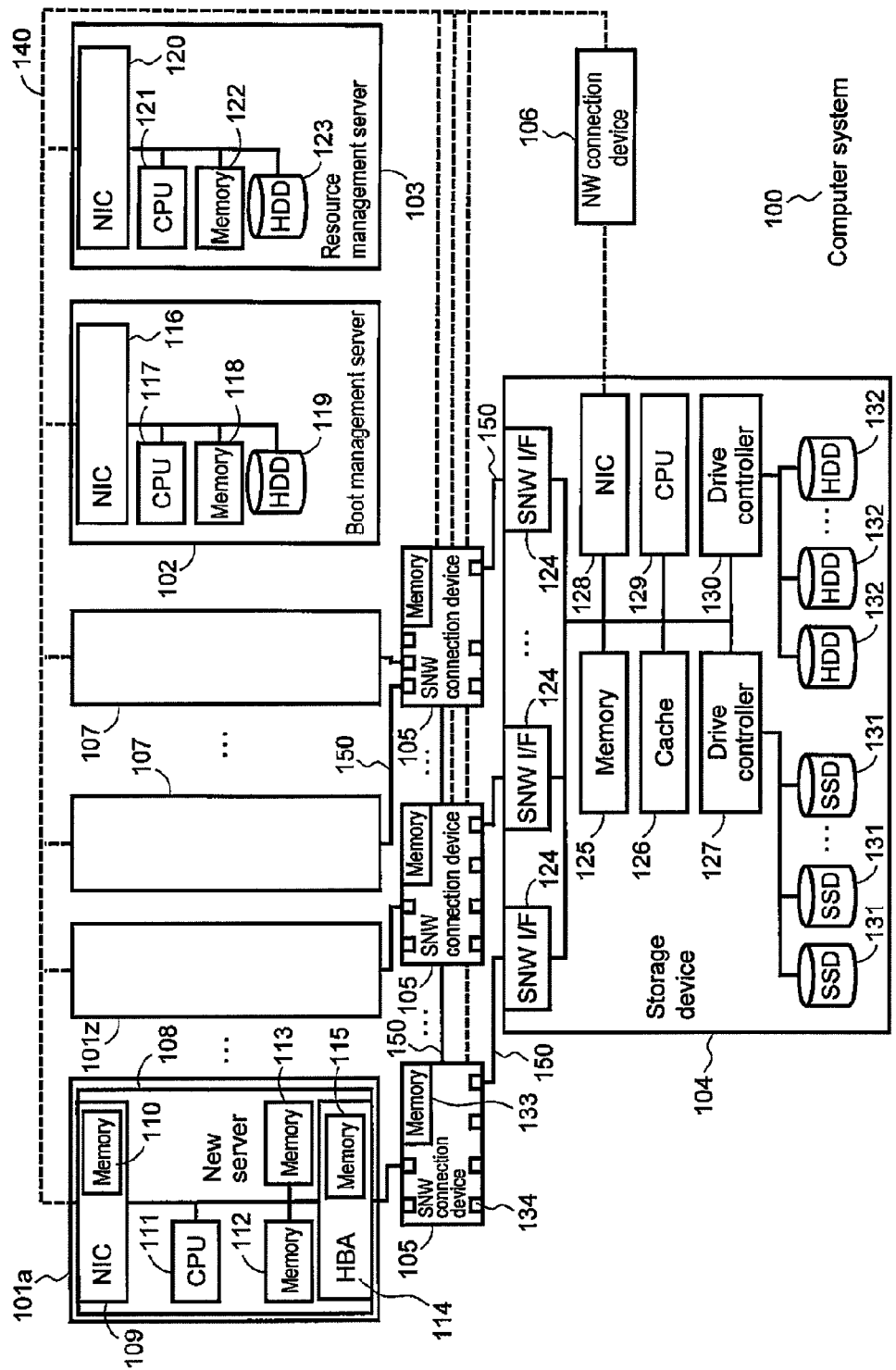
FIG. 1 is a diagram showing an exemplary schematic configuration of a computer system (a storage system) according to a first embodiment of the present invention.

Embodiments of the present invention will be described in detail below with reference to the drawings. Throughout the drawings for describing the embodiments, elements with like functions are given like symbols in principle and may not be described repeatedly.

While the embodiments are described with particularity sufficient for those skilled in the art to implement the present invention, it is to be understood that other implementations and embodiments are also possible, and modifications in configuration and structure and replacement of various elements are possible without departing from the scope and spirit of technical principles of the present invention. Therefore the following description should not be construed as limiting.

Further, as will be described below, embodiments of the present invention may be implemented in software running on a general-purpose computer or may be implemented in special-purpose hardware or a combination of software and hardware.

In the following description, pieces of information in the present invention will be described in "table" form. These pieces of information do not need to be represented in tabular data structures and may be represented in data structures such as a list, database, and queue, or in other forms. Accordingly, in order to indicate independence from data structures, a "table," "list," "database," "queue," etc., may be referred to simply as "information."

In describing the content of the pieces of information, expressions such as "identification information," "identifier," "name," "appellation" and "ID" can be used and these are interchangeable.

In the following, processes in the embodiments of the present invention will be described with "programs" being the subject (the agent of acts). Since the programs are executed by a processor to perform predetermined processes by using memory and a communication port (a communication control device), the processes may be described with the processor being the subject. The processes disclosed with the processor being the subject may be processes performed by a computer or information processing device such as a management server. Part or all of the programs may be implemented in special-purpose hardware, and may be modularized. The various programs may be installed into each computer by means of a program distribution server or a storage medium.

The present invention provides a technique for facilitating introducing a new server. More specifically, the present invention provides a technique for reducing an administrator's operational errors by connecting a new server to a SAN and automating SAN boot setting. The present invention also provides a technique for lightening the administrator's task of checking for a wrong connection by detecting a wrong connection made when a new server is connected to an SNW connection device.

In the present invention, a storage device manages PnP SAN information, and a resource management server instructs SAN boot setting on the basis of SAN type information obtained from the storage device. This can enable reducing an administrator's operational errors by connecting a new server to a SAN and automating SAN boot setting, and further enable lightening the administrator's task of checking for a wrong connection by detecting a wrong connection made when a new server is connected to an SNW connection device.

In a first embodiment of the present invention, a boot management server transmits configuration information to a resource management server, and the resource management server determines adding a new server to a resource pool and determines a wrong connection on the basis of SAN type information obtained from a storage device. In a second embodiment, a new server transmits the configuration information to the resource management server, and the resource management server determines adding the new server to the resource pool and determines a wrong connection on the basis of the SAN type information obtained from the storage device. Specific description will be given below.

(1) First Embodiment

<Configuration of Computer System>

FIG. 1 is a diagram showing an exemplary schematic configuration of a computer system (also referred to as a storage system) according to the first embodiment.

The computer system 100 includes at least one new server 101, at least one boot management server 102, at least one resource management server 103, at least one storage device (also referred to as a storage subsystem) 104, at least one SNW connection device 105, at least one NW connection device 106, at least one existing server 107, a LAN (Local Area Network: formed of Ethernet (R) cables) 140, and a SAN (Storage Area Network: formed of fiber channel cables) 150.

The new server 101 is a newly added server that becomes available in the computer system 100 through a SAN boot.

The new server 101 has a motherboard 108, an NIC 109, a CPU 111, a memory 112, a memory 113, and an HBA 114. The motherboard is a base for attaching thereon devices such as the MC 109, the CPU 111, the memory 112, the memory 113, and the HBA 114. The NIC 109 is connected to the boot management server 102 and the resource management server 103 and to the storage device 104 via the NW connection device 106 by Ethernet (R) cables to transmit and receive data to and from these devices. The CPU 111 is a device for executing processes of programs stored in the memory 112. The memory 112 is a device for storing programs and management tables. The memory 113 is a device for storing a BIOS for the motherboard, various BIOS-related settings, etc. The HBA 114 is a device connected to the storage device 104 via the SNW connection device 105 by fiber channel cables to transmit and receive data.

The boot management server 102 is a server for making settings for executing an initial boot of the new server 101. The new server 101 uses a boot program provided from the boot management server 102 to execute the initial boot for making settings for SAN-booting. The boot management server 102 has an MC 116, a CPU 117, a memory 118, and an HDD 119. The MC 116 is connected to the new server 101 and the resource management server 103 and to the storage device 104 via the NW connection device 106 by Ethernet (R) cables to transmit and receive data to and from these devices. The CPU 117 is a device for executing processes of programs stored in the memory 118. The memory 118 is a device for storing programs and management tables. The HDD 119 is a hard disk drive for storing data.

The resource management server 103 is a server for managing the new server 101 as a resource pool and for SAN-booting the new server 101 to set the storage device 104 and the new server 101. The resource management server 103 has an NIC 120, a CPU 121, a memory 122, and an HDD 123. The NIC 120 is connected to the boot management server 102 and to the storage device 104 via the NW connection device 106 by Ethernet (R) cables to transmit and receive data to and from these devices. The CPU 121 is a device for executing processes of programs stored in the memory 122. The memory 122 is a device for storing programs and management tables. The HDD 123 is a hard disk drive for storing data.

The storage device 104 holds a PnP SAN management table 1302, an operation OS 1802, etc., to be described below, in order to automatically set a SAN boot of the new server 101. The storage device 104 has SNW I/Fs 124, a memory 125, a cache 126, a drive controller 127, an MC 128, a CPU 129, a drive controller 130, SSDs 131, and HDDs 132. Each SNW I/Fs 124 of the storage device 104 is connected to the new server 101 via the SNW connection device 105 by fiber channel cables and transmits and receives data to and from the new server 101. The memory 125 is a device for storing programs and management tables. The cache 126 is a device for temporarily holding data for efficiently transmitting and receiving data to be written to and read from the SSDs 131 and the HDDs 132 via the SNW I/Fs 124. The drive controller 127 is a device for controlling data communication between the cache 126 and the SSDs 131. The NIC 128 is a device connected to the resource management server 103 via the NW connection device 106 by Ethernet (R) cables (LAN) to transmit and receive data to and from the resource management server 103. The CPU 129 is a device for executing processes of programs stored in the memory 125. The drive controller 130 is a device for controlling data communication between the cache 126 and the HDDs 132. The SSDs 131 are solid state drives for storing data. The HDDs 132 are hard disk drives for storing data.

The SNW connection device 105 is a device connected to the new server 101, the storage device 104, and other SNW connection devices 105 by fiber channel cables (SAN) to transmit and receive data to and from these devices. The SNW connection device 105 includes a memory 133 and ports 134. The memory 133 is a device for storing programs and management tables. The ports 134 are devices for transmitting and receiving data to and from the new server 101, the storage device 104, and other SNW connection devices 105. Although not shown, the SNW connection device 105 includes a CPU to execute processes of programs stored in the memory 133.

The NW connection device 106 is a device connected to the various servers and the storage device 104 by Ethernet (R) cables (LAN) to transmit and receive data to and from these devices.

The server 107 is a server to be newly added for use through a SAN boot or an existing server in the computer system 100, but the server 107 is not managed as the resource pool.

<Software Configuration of Resource Management Server>

Figure 2:
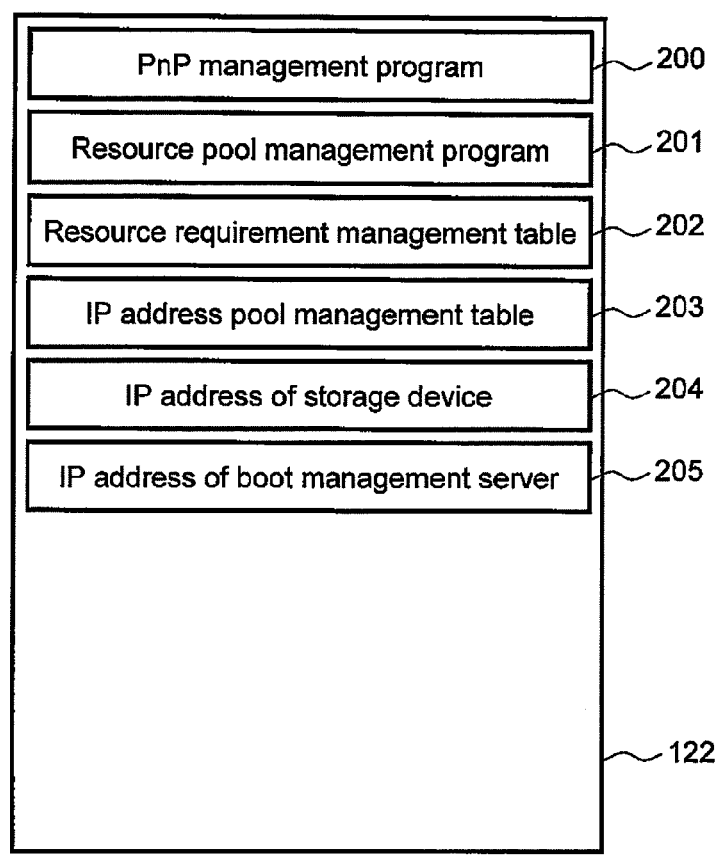
FIG. 2 is a diagram showing an exemplary internal configuration (software configuration) of memory of a resource management server.

FIG. 2 is a diagram showing an exemplary configuration of software and various sorts of information stored in the memory 122 of the resource management server 103.

The memory 122 holds a PnP management program 200, a resource pool management table 201, a resource requirement management table, an IP address pool management table 203, an IP address 204 of the storage device 104, and an IP address of the boot management server.

The PnP management program 200 communicates information necessary for automatic setting with the storage device 104, the new server 101, and the boot management server 102 for automatically setting a SAN boot of the new server 101. Details will be described below.

The resource pool management table 201 holds information on servers managed as the resource pool in the computer system 100. That is, configuration information obtained from the new server 101 is stored in the resource pool management table 201. In this embodiment, a SAN boot is executed for servers managed as the resource pool.

The resource requirement management table 202 holds configuration requirements on servers to be managed as the resource pool. Configuration information on servers that do not satisfy the set requirements is not stored in the above resource pool management table 201. Servers that are connected to a PnP SAN 1801 and satisfy the configuration requirements are managed as the resource pool by the resource management server 103.

The IP address pool management table 203 holds IP addresses to be assigned to the new servers 101. The IP addresses can be added or deleted according to the operation situation.

The IP address 204 of the storage device is used by the PnP management program 200 for communicating with the storage device 104.

The IP address 205 of the boot management server is used by the PnP management program 200 for communicating with the boot management server 102.

<Resource Pool Management Table>

FIG. 3 is a diagram showing an exemplary configuration of the resource pool management table 201 of the resource management server 103.

The resource pool management table 201 includes use status 300, WWN 301, MAC address 302, IP address 303, CPU virtualization function 304, memory capacity 305, and the number of CPU cores 306 as its entries. Other entries, for example the number of HBAs, the number of NICs, the number of internal HDDs, vendor name, and model number are also managed. Besides these entries, all information available from the new servers 101 may be managed.

The use status 300 is a value indicating whether each server managed as the resource pool is being used. "Yes" is recorded if the server is being used, and "No" is recorded if the server is registered as the pool but not being used.

The WWN 301 is the value of a World Wide Name of each server managed as the resource pool.

The MAC address 302 is a MAC address of each server managed as the resource pool.

The IP address 303 is an IP address of each server managed as the resource pool.

The CPU virtualization function 304 is a value indicating whether each server managed as the resource pool has a function of virtualizing a computer as a virtualized server.

The memory capacity 305 is the memory capacity of each server managed as the resource pool.

The number of CPU cores 306 is the value of the number of CPU cores of each server managed as the resource pool.

<Resource Requirement Management Table>

FIG. 4 is a diagram showing an exemplary configuration of the resource requirement management table 202 of the resource management server 103.

As requirements on servers to be managed as the resource pool, the resource requirement management table 202 has CPU virtualization function 400, memory capacity 401, the number of CPU cores 402, the number of HBAs 403, the number of NICs 404, the number of internal HDDs 405, vendor name 406, and model number 407 as its entries. The administrator uses a setting screen to be described below (see FIG. 21) to set these requirements. Only new servers that satisfy these requirements are registered as the resource pool and become available.

The CPU virtualization function 400 is information indicating whether or not a new server to be registered has (should have) a function of virtualizing a computer as a virtualized server. The memory capacity 401 is information indicating the minimum memory capacity required for the server. The number of CPU cores 402 is information indicating the number of CPU cores of the server. The number of HBAs 403 is information indicating the number of HBAs of the server. The number of NICs 404 is information indicating the number of NICs of the server. The number of internal HDDs 405 is the value of the number of internal HDDs of the server. The vendor name 406 is information indicating the vendor name of the server. The model number 407 is the value of the model number of the server.

<IP Address Pool Management Table>

Figures 5, 6:
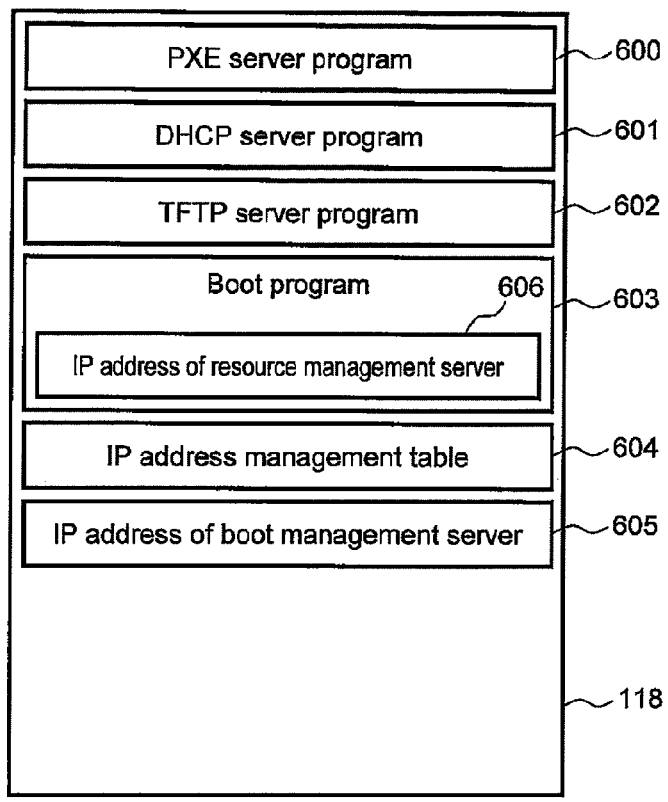
FIG. 5 is a diagram showing an exemplary configuration of an IP address pool management table of the resource management server.
FIG. 6 is a diagram showing an exemplary internal configuration (software configuration) of memory of a boot management server.

FIG. 5 is a diagram showing an exemplary configuration of the IP address pool management table 203 of the resource management server 103.

The IP address pool management table 203 includes use status 500 and IP address 501 as its entries.

The use status 500 is a value indicating whether each IP address 501 is assigned to a server managed as a pool. "Yes" is recorded for an IP address assigned and being used, and "No" is recorded for an unassigned IP address.

The IP address 501 indicates IP addresses that can be assigned to the new servers 101 when the new servers 101 are managed as the resource pool.

<Software Configuration of Boot Management Server>

FIG. 6 is a diagram showing an exemplary configuration of software and various sorts of information stored in the memory 118 of the boot management server 102.

The memory 118 holds a PXE server program 600, a DHCP server program 601, a TFTP server program 602, a boot program 603, an IP address management table 604, and an IP address 605 of the boot management server.

The PXE server program 600 communicates with a PXE client program 802 of the new server 101 as to an IP address of the boot management server and a file name of an NBP (Network Bootstrap Program).

The DHCP server program 601 statically or dynamically assigns an IP address to the new server 101 with DHCP (Dynamic Host Configuration Protocol). Statically assigning an IP address has an advantage of the easiness of management because the IP address is fixed and will not change once it is set. Dynamically assigning an IP address has an advantage of the ability of flexibly addressing the situation although the IP address changes upon boot of the server.

The TFTP server program 602 transmits the boot program 603 to the new server 101 with TFTP (Trivial File Transfer Protocol).

The boot program 603 is started in the new server 101 and transmits the configuration information on the new server 101 to the resource management server 103.

The boot program 603 holds an IP address 606 of the resource management server.

The IP address 606 of the resource management server is used by the boot program 603 for communicating with the resource management server 103.

The IP address management table 604 holds IP addresses to be assigned to servers by the DHCP server program 601. A new IP address to be assigned is determined using the IP address pool management table 203 of the resource management server 103, and is set by the boot management server 102. Accordingly, the IP address management table 604 manages IP addresses that can be actually assigned to servers in a static or dynamic manner.

The IP address 605 of the boot management server is used when the new server 101 communicates with the boot management server 102.

<IP Address Management Table>

Figure 7:
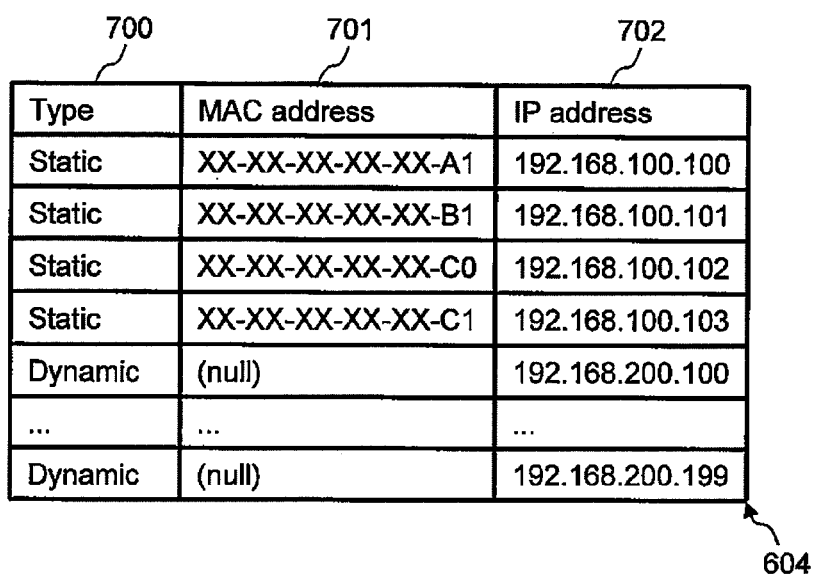
FIG. 7 is a diagram showing an exemplary configuration of an IP address management table of the boot management server.

FIG. 7 is a diagram showing an exemplary configuration of the IP address management table 604 of the boot management server 102.

The IP address management table 604 includes type 700, MAC address 701, and IP address 702 as its entries.

The type 700 is information indicating whether an IP address assigned to each server is dynamic or static.

The MAC address 701 is information indicating a MAC address of the server to which each IP address 702 is assigned.

The IP address 702 is information indicating an IP address that can be assigned to each server by the DHCP server program 601.

<Software Configuration of New Server>

Figures 8, 9A:
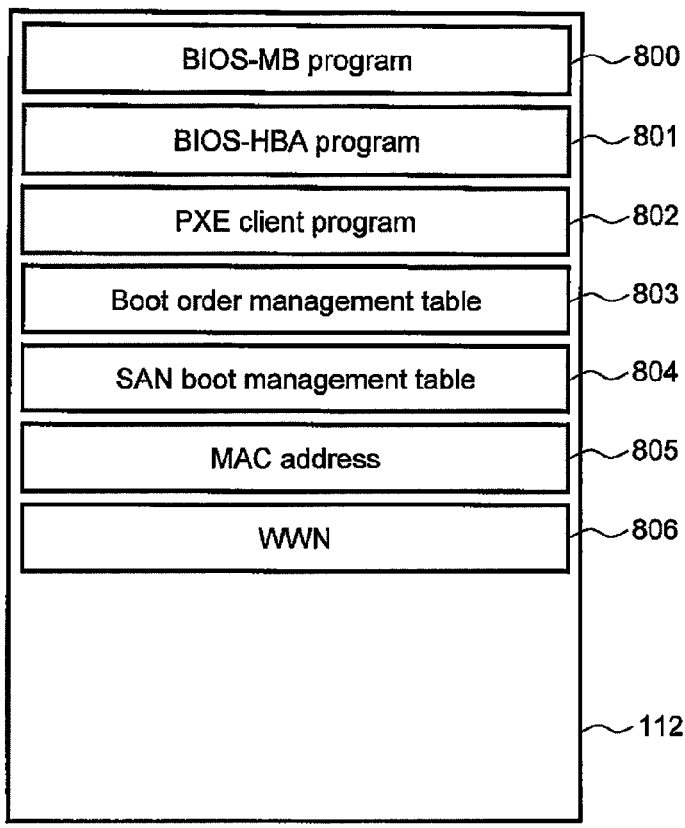
FIG. 8 is a diagram showing an exemplary internal configuration (software configuration) of memory of a server (a new server) newly connected to a PnP SAN.
FIG. 9A is a diagram showing an exemplary configuration of a boot order management table (before being modified) for a motherboard according to the first embodiment.

FIG. 8 is a diagram showing an exemplary configuration of software and various sorts of information stored in the memory 112 of the server (the new server) 101 newly connected to the PnP SAN.

The memory 112 holds a BIOS-MB program 800, a BIOS-HBA program 801, a PXE client program 802, a boot order management table 803, a SAN boot management table 804, a MAC address 805, and a WWN 806.

The BIOS-MB program 800 is a BIOS program for the motherboard 108 and is read from the memory 113. The BIOS-MB program 800 starts first after the boot of the new server 101 and manages a boot order, etc. Examples of the boot order management include a device boot order as shown in FIG. 9.

The BIOS-HBA program 801 is a BIOS program for the HBA 114 and is read from the memory 115. The BIOS-HBA program 801 communicates with the storage device 104 to read an OS (an operation OS: a LUN of the storage device 104) residing in the storage device in order to execute a SAN boot.

The PXE client program 802 communicates with the PXE server program 600 to obtain the IP address of the boot management server and the file name of the NBP (Network Bootstrap Program). The PXE client program 802 also obtains the boot program from the TFTP server program 602 of the boot management server 102, executes a LAN boot, and transmits the configuration information on this new server to the resource management server 103.

The boot order management table 803 holds the boot order of the new server 101.

The SAN boot management table 804 holds access destinations in the storage device 104 and their order of priority, according to which the new server 101 SAN-boots.

The MAC address 805 is a MAC address of the new server 101.

The WWN 806 is a World Wide Name of the HBA 114.

<Boot Order Management Table>

FIG. 9A is a diagram showing an exemplary configuration of the boot order management table 803 (before being modified) for the motherboard 108. FIG. 9B is a diagram showing an exemplary configuration of the boot order management table 803 (after being modified) for the motherboard 108. The boot order management table 803 has boot order 900 and device 901 as its entries.

The boor order 900 is information about the order of priority of accesses for reading programs necessary when the new server 101 starts.

The device 901 is the type of each device accessed by the new server 101 for booting.

FIG. 9A is referred to at the time of a LAN boot (obtaining the resource information (the configuration information)), and FIG. 9B is referred to at the time of a SAN boot (associating the new server with the storage device). In FIG. 9A, while the boot is sequentially executed starting from the first device in the boor order, targets to be booted do not exist up to the third device and therefore the first boot is executed for the fourth device, i.e., a PXE 903. Since the PXE 903 means a LAN boot, a LAN boot is executed if FIG. 9A is referred to. In FIG. 9B, the fourth device, i.e., a SAN 904 is registered at a higher place than the PXE 903. Therefore a SAN boot is executed if FIG. 9B is referred to.

<SAN Boot Management Table>

FIG. 10 is a diagram showing an exemplary configuration of the SAN boot management table 804 for each HBA 114.

The SAN boot management table 804 is a table for managing LU connections from the perspective of the new server and has order 1000, WWN 1001, and LUN 1002 as its entries.

The order 1000 is information indicating the order of priority of LUNs as access targets to be read when the new server 101 SAN-boots.

The WWN 1001 is information indicating a WWN of each SNW I/F of the storage device 104 for the access target to be read when the new server 101 SAN-boots.

The host LUN 1002 is an identifier of each LU provided by the storage device to the new server to be accessed when the new server 101 SAN-boots.

<Software Configuration of SNW Connection Device>

Figure 11:
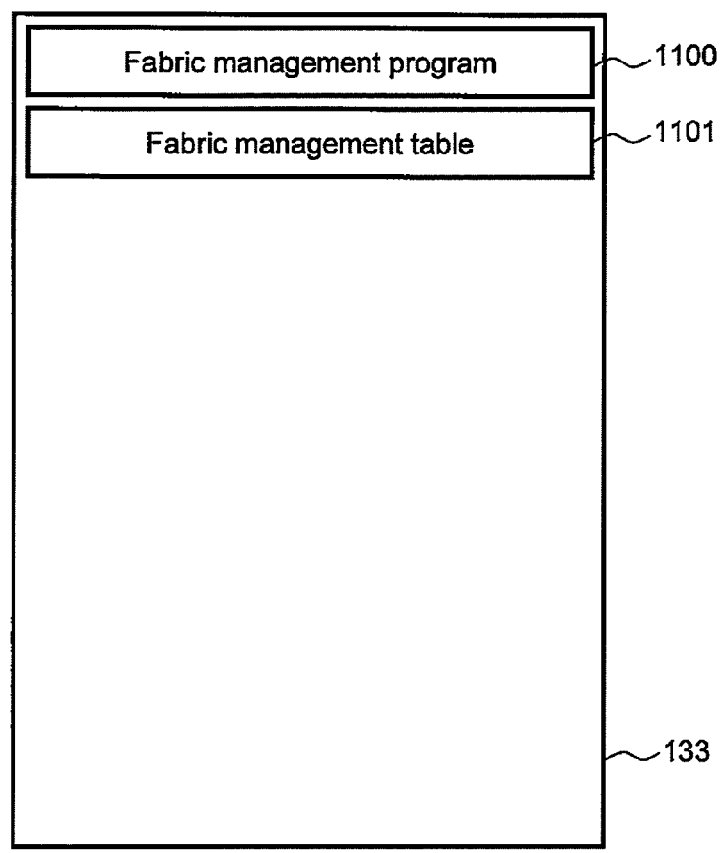
FIG. 11 is a diagram showing an exemplary internal configuration (software configuration) of memory of an SNW connection device.

FIG. 11 is a diagram showing an exemplary configuration of software and various sorts of information stored in the memory 133 of each SNW connection device 105.

The memory 133 holds a fabric management program 1100 and a fabric management table 1101.

The fabric management program 1100 manages connection states of other devices with the SNW connection device 105 and information on the SNW connection device 105.

The fabric management table 1101 holds information related to fiber channel-connected devices connected to the SNW connection device 105.

<Fabric Management Table>

FIG. 12 is a diagram showing an exemplary configuration of the fabric management table 1101 of the SNW connection device 105.

The fabric management table 1101 is a table for managing devices that reside in the computer system 100 and are connected to respective ports of the SNW connection device 105.

The fabric management table 1101 has SW ID 1200, SW port ID 1201, WWN of SW port 1202, type 1203, and WWN 1204 as its entries.

The SW ID 1200 is information (an identifier) for specifying and identifying each corresponding SNW connection device 105.

The SW port ID 1201 is information (an identifier) for specifying and identifying each port 134 of each SNW connection device 105.

The WWN of SW port 1202 is information indicating a WWN of each port 134. This information is fixed information and registered irrespective of the presence or absence of device connection.

The type 1203 is information indicating the type of a device connected to each port 134. For a port with no device connected thereto, null is designated. Here, initiator means a new server (a server managed as the pool), and target means the storage device 104.

The WWN 1204 is the value of a WWN of the device connected to each port 134. For a port with no device connected thereto, null is designated.

<Software Configuration of Storage Device>

Figure 13:
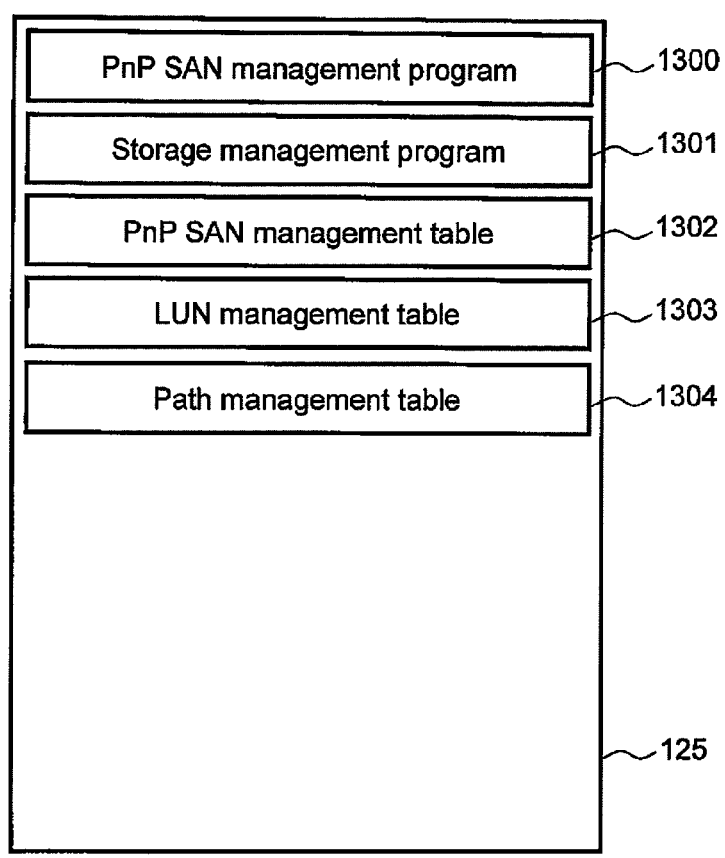
FIG. 13 is an illustrative diagram showing an example of memory of a storage device.

FIG. 13 is a diagram showing an exemplary configuration of software and various sorts of information stored in the memory 125 of the storage device 104.

The memory 125 holds a PnP SAN management program 1300, a storage management program 1301, a PnP SAN management table 1302, a LUN management table 1303, and a path management table 1304.

The PnP SAN management program 1300 communicates with the SNW connection device 105 and the resource management server 103 as to the fabric management information at the time of booting (see FIG. 12).

The storage management program 1301 communicates with the resource management server 103 and the new server 101 as to changes in the storage device configuration (e.g., an increase or decrease in the number of LUs). This communication may be performed periodically or at an administrator-set time, or may be performed when a configuration change occurs.

Figure 18:
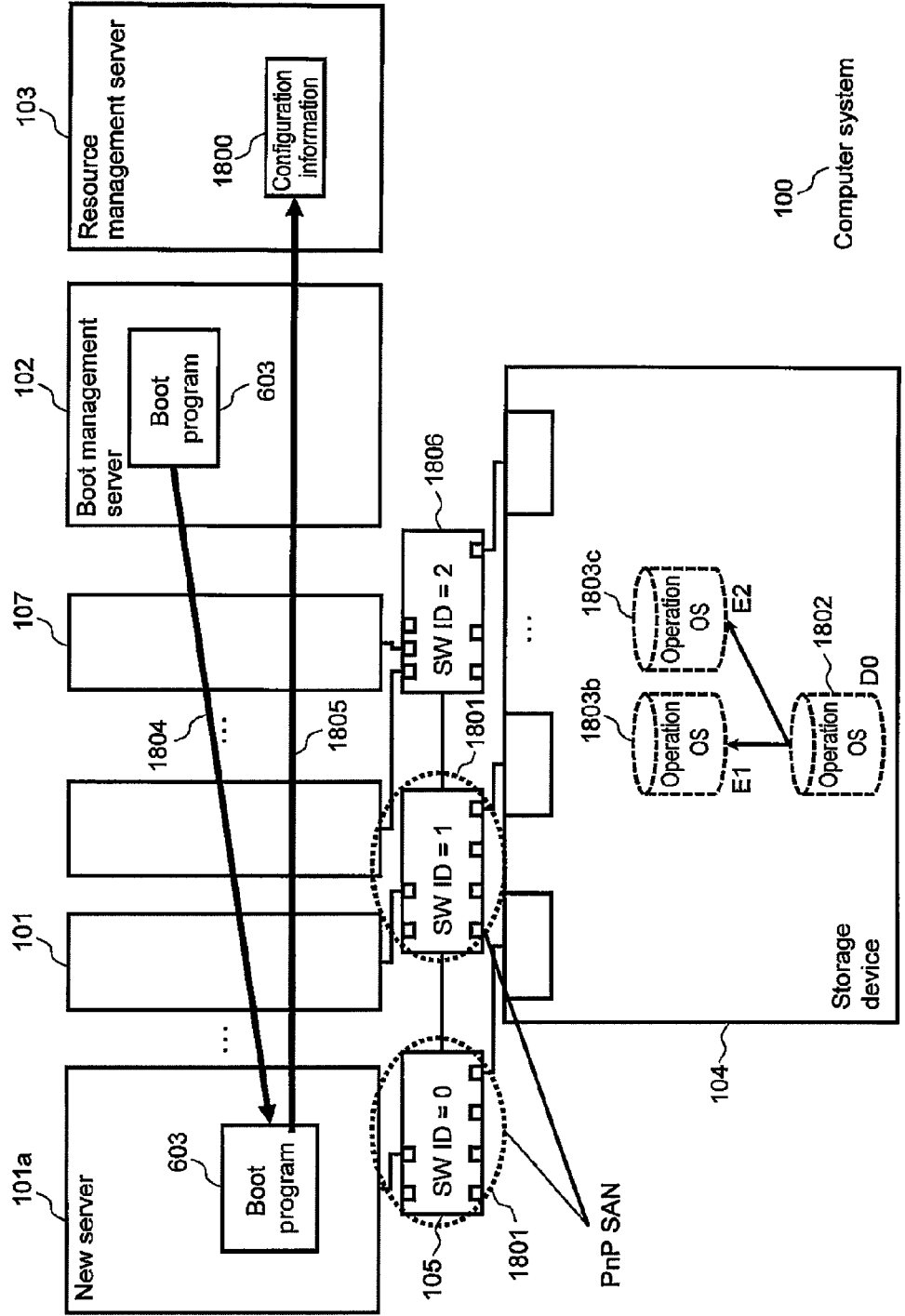
FIG. 18 is a diagram for describing a logical configuration in adding a resource according to the first embodiment.

The PnP SAN management table 1302 is a table for managing information on the PnP SAN 1801 that is the SNW connection devices 105 to which servers managed as the resource pool are connected, and information on devices connected to the PnP SAN 1801 (see FIG. 18).

The LUN management table 1303 is a table for managing information (identifiers) for specifying and identifying LUs managed in the storage device 104 and read by the new server 101 when SAN-booting.

The path management table 1304 is a table for managing connection information (correspondences between servers and LUs) on the new servers 101 and the storage device 104.

<PnP SAN Management Table>

FIG. 14 is a diagram showing an exemplary configuration of the PnP SAN management table 1302 of the storage device 104.

The PnP SAN management table 1302 has PnP SAN 1400, SW ID 1401, SW port ID 1402, WWN of SW port 1403, type 1404, and WWN 1405 as its entries.

The PnP SAN 1400 is information indicating whether a special-purpose device to be added to the resource pool is connected to each SNW connection device 105. "Yes" indicates that a device to be registered as the resource pool is connected to the SNW connection device. "No" indicates that a device not to be registered as the resource pool (e.g., a management server) is connected to the SNW connection device.

The SW ID 1401 is information (an identifier) for specifying and identifying each SNW connection device 105.

The SW port ID 1402 is information (an identifier) for specifying and identifying each port 134 of each SNW connection device 105.

The SW port WWN 1403 is information indicating a WWN of each port 134.

The type 1404 is information indicating the type of a device connected to each port 134.

The WWN 1405 is information indicating a WWN of the device connected to each port 134.

FIG. 14 manages information in the storage device 104 before the fabric information is obtained. For example, even if a port (SW port ID=1) of an SNW connection device (SW ID=0) has a new server (initiator) connected thereto (see FIG. 12), information in the relevant column in FIG. 14 is "null" because the fabric information is not yet obtained. The information in FIG. 12 will be reflected in FIG. 14 by performing a process in step 2311 to be described below (see FIG. 23).

<LUN Management Table>

FIG. 15 is a diagram showing an exemplary configuration of the LUN management table 1303 of the storage device 104.

The LUN management table 1303 has P-VOL (Primary Volume) LUN 1500 and V-VOL (Virtual Volume) LUN 1501 as its entries.

The P-VOL LUN 1500 is information (an identifier) for specifying and identifying each LU that stores data serving as a basis of a booting volume to be provided to the new server 101.

The V-VOL LUN 1501 is information (an identifier) for specifying and identifying each LU generated by making a logical copy (also referred to as a snapshot) of each P-VOL LU.

For a V-VOL LU immediately after logically copied, data is not copied but an address is copied, and an address indicating data to be accessed is a P-VOL LU. If new data is written to the V-VOL LU, the data is not written to the P-VOL LU but stored in another storage area. The address indicating the data to be accessed in the V-VOL LU is changed to indicate that other storage area.

<Path Management Table>

FIG. 16 is a diagram showing an exemplary configuration of the path management table 1304 of the storage device 104.

The path management table 1304 has WWN of SNW I/F 1600, WWN of HBA 1601, host LUN 1602, and LUN 1603 as its entries.

The WWN of SNW I/F 1600 is information (an identifier) for specifying and identifying a WWN of each SNW I/F 124.

The WWN of HBA 1601 is information (an identifier) for specifying and identifying a WWN of each HBA 114.

The host LUN 1602 is information (an identifier) for specifying and identifying an LU to be provided by the storage device 104 to each server. The server 101 uses the WWN of SNW I/F 1600 and the host LUN 1602 to identify the LU of the storage device 104.

The LUN 1603 is information (an identifier) for specifying and identifying each LU of the storage device 104.

By using the above path management table 1304 to generate a path, the storage device 104 can provide a particular LU only to a server having a particular HBA.

<General Outline of Processes>

Figure 17:
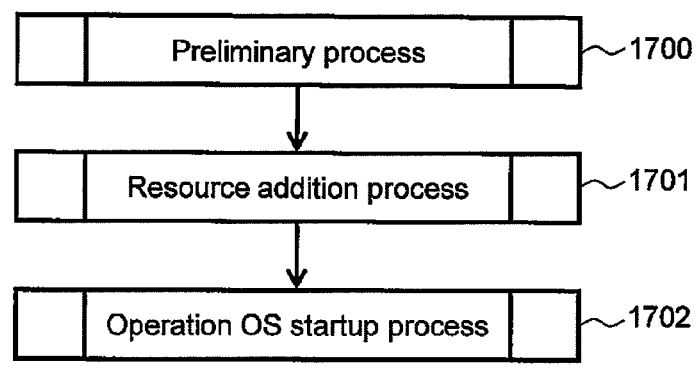
FIG. 17 is a flowchart for describing a general outline of processes.

FIG. 17 is a flowchart for describing a general outline of processes according to the first embodiment.

The computer system 100 performs a preliminary process, a resource addition process, and an operation OS boot process.

In the preliminary process, the administrator performs preliminary setting before automatic SAN boot setting is performed (step 1700).

In the resource addition process, the PnP management program 200 performs a process up to registering the configuration information on the new server 101 in the resource pool management table 201 (step 1701).

In the operation OS boot process, a process is performed in which the storage device 104 generates an LU of an operation OS and a path between the LU and the new server 101, and the new server 101 starts with the operation OS to obtain an IP address (step 1702). The operation OS boot process is a process for enabling the server to start through the above-described SAN boot.

<Logical Configuration in Resource Addition Process>

FIG. 18 is a diagram showing an exemplary logical configuration in the resource addition process (the concept of the resource addition process) in the first embodiment.

In FIG. 18, configuration information 1800 is configuration information on the new server 101 obtained by the resource management server 103 from the new server 101.

According to settings made by the administrator in the preliminary process (step 1700), a PnP SAN 1801 is adapted to function as the SNW connection devices 105 to which servers managed as the resource pool are connected (PnP SAN).

An operation OS 1802 is an OS (an LU) to be started by the new server 101 in a SAN boot. The operation OS 1802 is a copy source of logical copies. The operation OS is configured such that an IP address is obtained with DHCP. Operation OSs 1803 are logical copies of the operation OS 1802.

In the resource addition process, first, the new server 101 is newly connected to the PnP SAN 1801. Then, the new server 101 starts by downloading the boot program 603 from the boot management server 102 (step 1804) and executes a LAN boot. The new server 101 transmits the configuration information 1800 to the resource management server 103 (step 1805).

To an SNW connection device 1806 that is not set as the PnP SAN 1801, the server 107 that is not managed as the resource pool is connected. Therefore, if the server 101 that should be managed as the resource pool is connected to the SNW connection device 1806, that connection is recognized as a wrong connection. In contrast, if the server 107 that should not be managed as the resource pool is connected to the PnP SAN 1801, that connection is determined as a wrong connection.

<Logical Configuration in Operation OS Boot Process>

Figure 19:
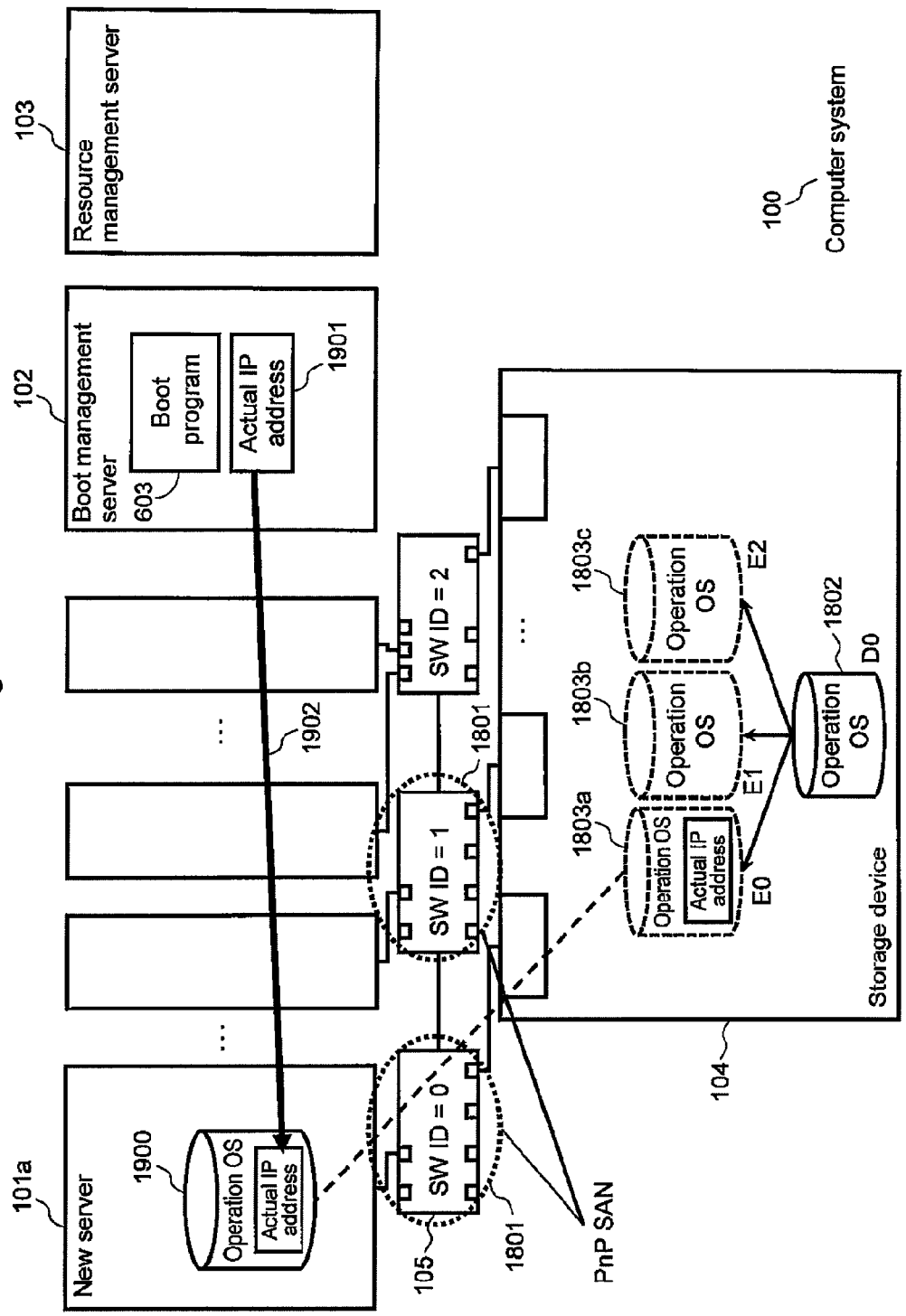
FIG. 19 is a diagram for describing a logical configuration in starting an operation OS and acquiring a permanent IP address according to the first embodiment.

FIG. 19 is a diagram showing an exemplary logical configuration (a process concept) in the operation OS boot process and a permanent IP address acquisition process in the first embodiment.

In FIG. 19, an operation OS 1900 is an operation OS 1803*a* detected (read) by the new server 101. A permanent IP address 1901 is an IP address (the IP address 702 in FIG. 7) used by the new server 101 for operation.

The storage device 104 first generates the operation OS 1803*a* that is a logical copies of the operation OS 1802, and a path to the operation OS 1803*a*.

After starting the operation OS 1900, the new server 101*a* obtains the permanent IP address 1901 from the boot management server 102. The new server 101*a* sets the permanent IP address 1901 for the operation OS 1900 to become ready for starting communication. That is, the operation OS (the LU) 1803*a* is associated with the new server 101*a*, and the IP address is set for the LU.

<Details of Preliminary Process>

Figure 20:
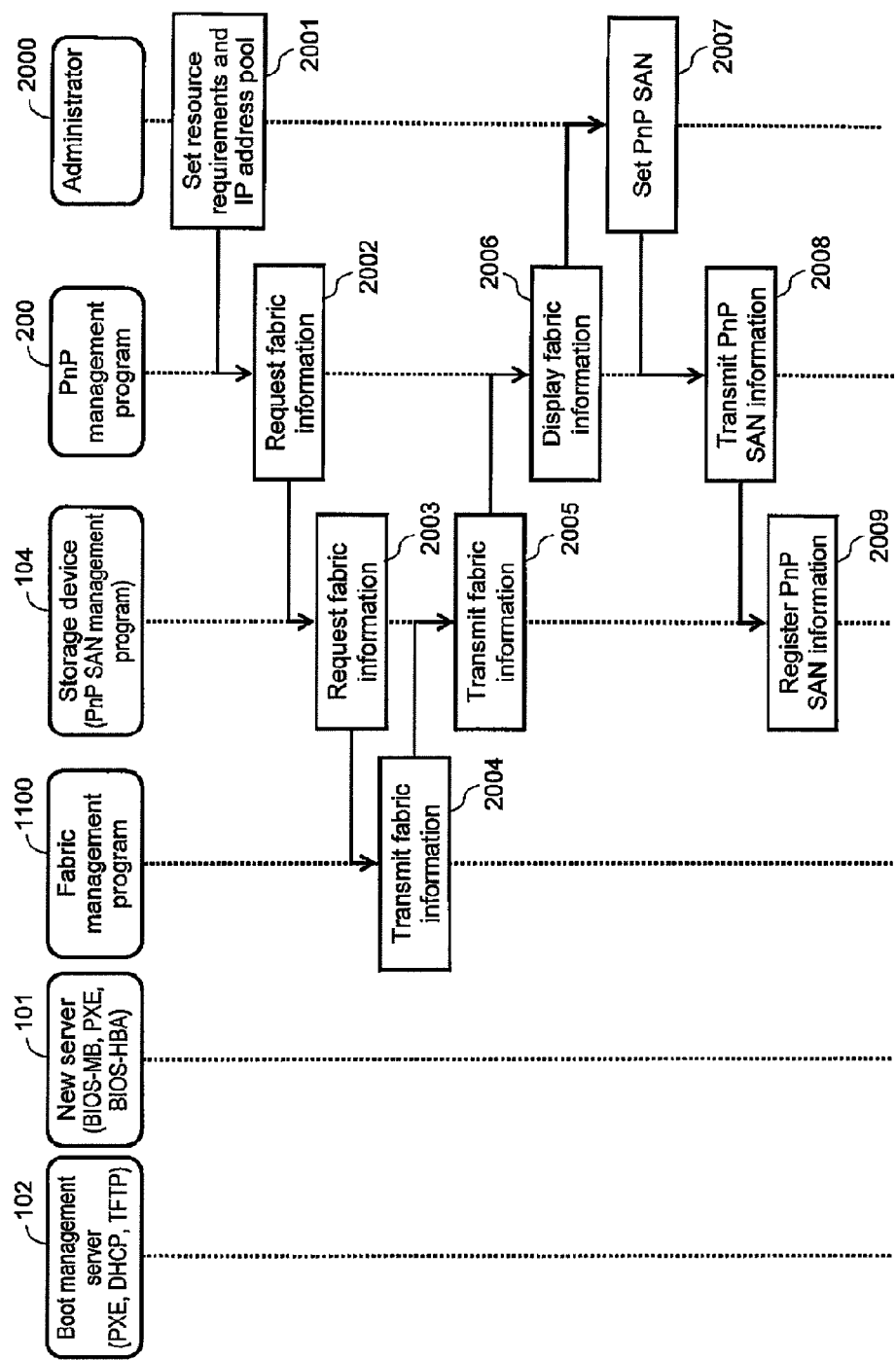
FIG. 20 is a flowchart for describing a preliminary process according to the first embodiment.

FIG. 20 is a flowchart for describing the details of the preliminary process in the first embodiment. Communications involved in the preliminary process are performed via the LAN 140.

An administrator 2000 manages the computer system 100 in which the new server 101 is SAN-booted.

The administrator 2000 operates the resource management server (computer) 103, and uses a GUI of the PnP management program 200 (see FIG. 21, where an IP address pool setting screen is not shown) to set resource requirements and an IP address pool (step 2001).

The PnP management program 200 registers the resource requirements set by the administrator 2000 in the resource requirement management table 202. The PnP management program 200 also registers the IP address pool set by the administrator 2000 in the IP address pool management table 203.

The PnP management program 200 requests to transmit fabric information from the PnP SAN management program 1300 of the storage device 104 (step 2002).

The PnP SAN management program 1300 relays the fabric information transmission request to the fabric management program 1100 of the SNW connection device 105 (step 2003).

The fabric management program 1100 communicates with other SNW connection devices 105 to discover the fabric (connection statuses), and obtains the fabric information to update the fabric management table 1101. The fabric management program 1100 transmits the fabric information to the PnP SAN management program 1300 of the storage device 104 (step 2004).

The PnP SAN management program 1300 of the storage device 104 relays the obtained fabric information to the PnP management program 200 of the resource management server 103 (step 2005).

The PnP management program 200 displays the fabric information in a GUI (see FIG. 22) (step 2006). The fabric information may be directly obtained from the fabric management program 1100 without the intervention of the PnP SAN management program 1300.

Figure 21:
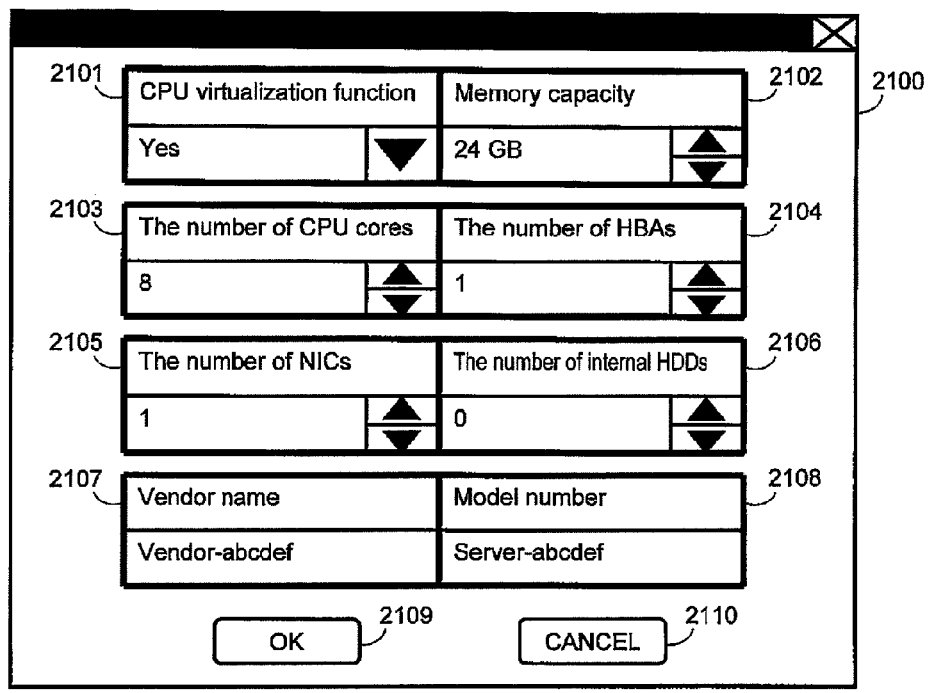
FIG. 21 is a diagram showing an exemplary configuration of a resource requirement setting screen of a PnP management program according to the first embodiment.

The administrator 2000 refers to the displayed fabric information to set a PnP SAN (step 2007). For example, the administrator may put a checkmark at PnP SAN 2201 in FIG. 22 to set the SNW connection devices 105 as the PnP SAN. Although FIG. 20 shows that the settings are input independently in each of steps 2001 and 2007, the setting of the resource requirements and the IP address pool may be performed simultaneously with the PnP SAN setting when the PnP SAN is set. In that case, a GUI having a combination of the entries shown in the GUIs in FIGS. 21 and 22 is displayed, and the administrator uses that setting screen to perform respective settings.

The PnP management program 200 receives the PnP SAN information set by the administrator 2000 and transmits this information to the PnP SAN management program 1300 (step 2008).

The PnP SAN management program 1300 registers the PnP SAN information in the PnP SAN management table 1302 (step 2009). The registered information is indicated as Yes or No in the PnP SAN 1400 in FIG. 14.

<Resource Requirement Setting Screen>

FIG. 21 is a diagram showing an exemplary configuration of a resource requirement setting screen (GUI) 2100 provided by the PnP management program 200.

The GUI 2100 is a GUI on which the administrator 2000 sets the server configuration requirements for adding new servers to the resource pool. The GUI 2100 includes a CPU virtualization function setting field 2101, a memory capacity setting field 2102, the number of CPU cores setting field 2103, the number of HBAs setting field 2104, the number of NICs setting field 2105, the number of internal HDDs setting field 2106, a vendor name setting field 2107, a model number setting field 2108, an OK button 2109, and a cancel button 2110.

The CPU virtualization function setting field 2101 is a field for setting a requirement of the CPU virtualization function for adding servers to the resource pool.

The memory capacity setting field 2102 is a field for setting a requirement of the memory capacity for adding servers to the resource pool.

The number of CPU cores setting field 2103 is a field for setting a requirement of the number of CPU cores for adding servers to the resource pool.

The number of HBAs setting field 2104 is a field for setting a requirement of the number of HBAs for adding servers to the resource pool.

The number of NICs setting field 2105 is a field for setting a requirement of the number of NICs for adding servers to the resource pool.

The number of internal HDDs setting field 2106 is a field for setting a requirement of the number of internal HDDs for adding servers to the resource pool.

The vendor name setting field 2107 is a field for setting a requirement of the vendor name for adding servers to the resource pool.

The model number setting field 2108 is a field for setting a requirement of the model number for adding servers to the resource pool.

The OK button 2109 is a button that the administrator 2000 presses when the setting is completed.

The cancel button 2110 is a button that the administrator 2000 presses when canceling the setting.

<PnP SAN Setting Screen>

FIG. 22 is a diagram showing an exemplary configuration of a PnP SAN setting screen (GUI) 2200 provided by the PnP management program 200.

The PnP SAN setting screen 2200 includes a PnP SAN setting field 2201, an SW ID 2202, an SW port ID 2203, a WWN of the SW port 2204, an OK button 2205, and a cancel button 2206.

The PnP SAN setting field 2201 is a field for making a setting as to whether to set each SNW connection device 105 as the PnP SAN. If the SNW connection device 105 is to be set as the PnP SAN, the administrator places a checkmark in this field.

The SW ID 2202 is information (an identifier) for specifying and identifying each SNW connection device 105.

The SW port ID 2203 is information (an identifier) for specifying and identifying each port of each SNW connection device 105.

The WWN of the SW port 2204 is information indicating a WWN of each port of each SNW connection device 105.

The OK button 2205 is a button that the administrator 2000 presses when the setting is completed.

The cancel button 2206 is a button that the administrator 2000 presses when canceling the setting.

<Details of Resource Addition Process>

Figure 23:
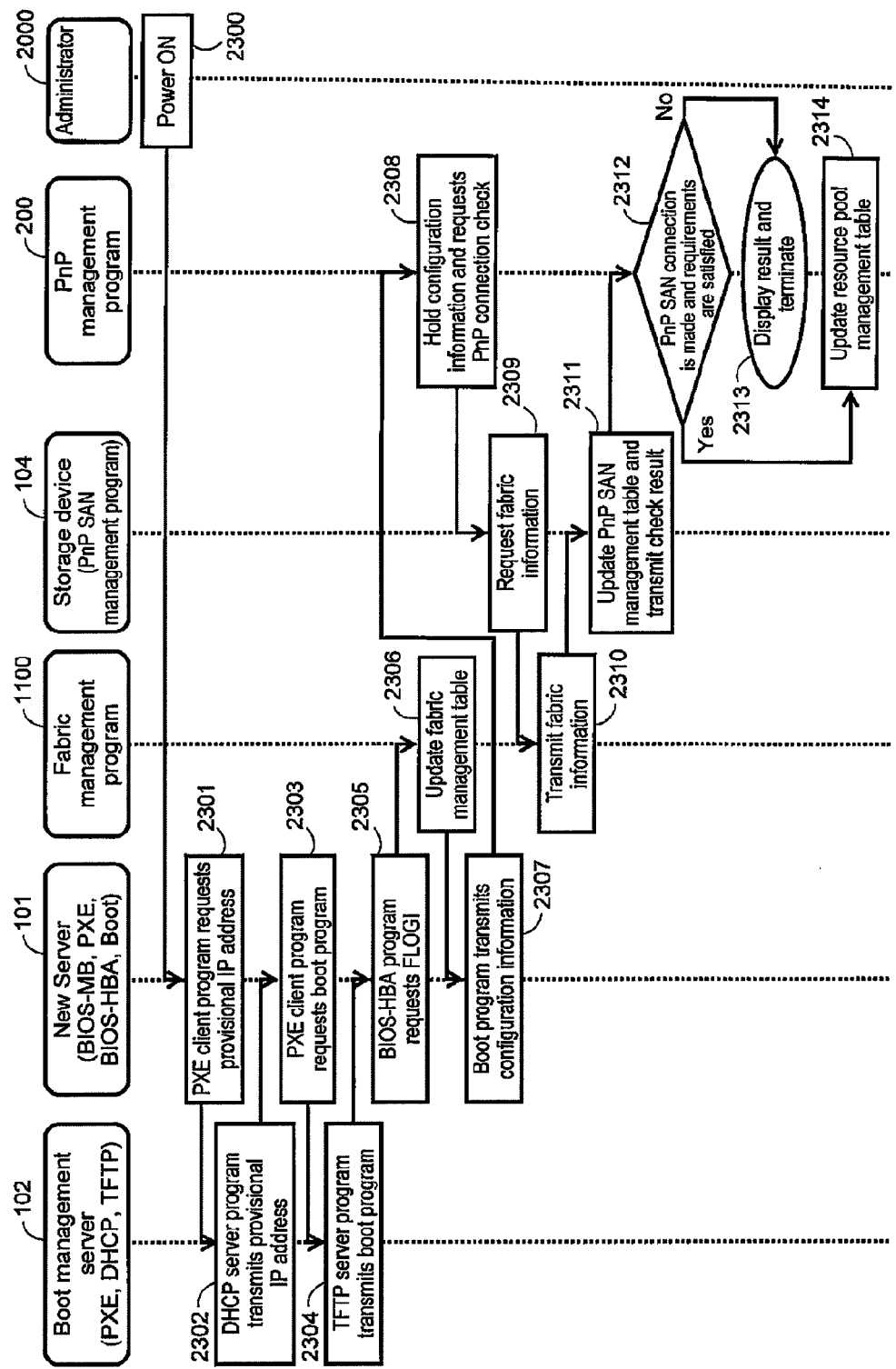
FIG. 23 is a flowchart for describing a resource addition process according to the first embodiment.

FIG. 23 is a flowchart (an example) for describing the details of the resource addition process in the first embodiment.

The administrator 2000 connects the new server 101a to the SNW connection device 105 and powers up the new server 101a (step 2300). It is assumed here that the server to be newly added is the new server 101*a*, and other servers are already connected to the SNW connection devices 105.

Upon power-up of the new server 101*a*, the PXE client program 802 of the new server 101 starts and requests a temporary IP address from the DHCP server program 601 of the boot management server 102 (step 2301).

The DHCP server program 601 determines a temporary IP address (a dynamic IP address) to be assigned, updates the IP address management table 604, and transmits the temporary IP address to the PXE client program 802 (step 2302).

The PXE client program 802 receives the temporary IP address and requests the TFTP server program 602 to transmit the boot program 603 (step 2303).

In response to the transmission request, the TFTP server program 602 transmits the boot program 603 to the PXE client program 802 (step 2304).

The new server 101 starts with the boot program 603, and the BIOS-HBA program 801 issues a request for FLOGI (Fabric Login) to the fabric management program 1100 of the SNW connection device 105 (step 2305).

The fabric management program 1100 receives the FLOGI request and updates the fabric management table 1101 (FIG. 12) (step 2306). Thus, the new server 101*a* is recognized as a connected device by the SNW connection device 105.

The boot program 603 running in the new server 101*a* refers to the IP address 606 of the resource management server and transmits the configuration information on the new server 101*a* to the PnP management program 200 via the LAN 140 (step 2307).

The PnP management program 200 holds the received configuration information in the memory 122 and issues a request for PnP connection check to the PnP SAN management program 1300 of the storage device 104 (step 2308). At this point, the PnP management program 200 of the resource management server 103 transmits the WWN included in the configuration information obtained from the new server 101*a* to the PnP SAN management program 1300 of the storage device 104.

The PnP SAN management program 1300 requests the fabric management program 1100 of the PnP SAN (the SNW connection device 105) to transmit fabric information (step 2309).

The fabric management program 1100 obtains the fabric information from the fabric management table 1101 and transmits the fabric information to the PnP SAN management program 1300 (step 2310).

The PnP SAN management program 1300 compares the received fabric information with the information in the PnP SAN management table 1302 (see FIG. 14) to determine whether the WWN received from the PnP management program 200 has been newly added to the fabric. The PnP SAN management program 1300 transmits the result of this PnP SAN determination to the PnP management program 200. The PnP SAN determination result is represented as "Yes" if the WWN has been newly added, or "No" otherwise (step 2311). For example, from the comparison between the PnP SAN management table 1302 (FIG. 14) and the fabric management table 1101 (FIG. 12), it can be seen that an initiator has been added to the fabric management table 1101 (the second line).

The PnP management program 200 refers to the resource requirement management table 202 and the received PnP SAN determination result. If the resource requirements are satisfied and the PnP SAN determination result is "Yes", the process transitions to step 2314. Otherwise, the process transitions to step 2313 (step 2312).

The PnP management program 200 displays, on a GUI (not shown), whether or not the resource requirements are satisfied and the PnP SAN determination result, along with the server configuration information including the WWN (step 2313). The administrator 2000 can check this display to see whether a wrong connection has been made. This display also shows the date and time when the new server 101 was detected, and a history of previously detected new servers 101. In this manner, the administrator 2000 can know how many servers were erroneously connected among recently added new servers 101.

The PnP management program 200 registers, in the resource pool management table 201, the configuration information that has been held (step 2314). At this point, as in step 2313, the PnP management program 200 displays information on the new server 101 added to the resource pool so that the administrator 2000 can check the information. In step 2314, before the new server 101 is added, the number of servers to be newly added to the resource pool may be input in advance by the administrator 2000 to the resource management server 103, and the PnP management program 200 may display whether the pre-input number of servers matches the number of servers detected in a certain period of time, and may display the number of new servers 101 added to the resource pool among the detected new servers 101. In this manner, the administrator 2000 can readily know whether wrong connections have been made.

<Details of Operation OS Boot Process>

Figure 24:
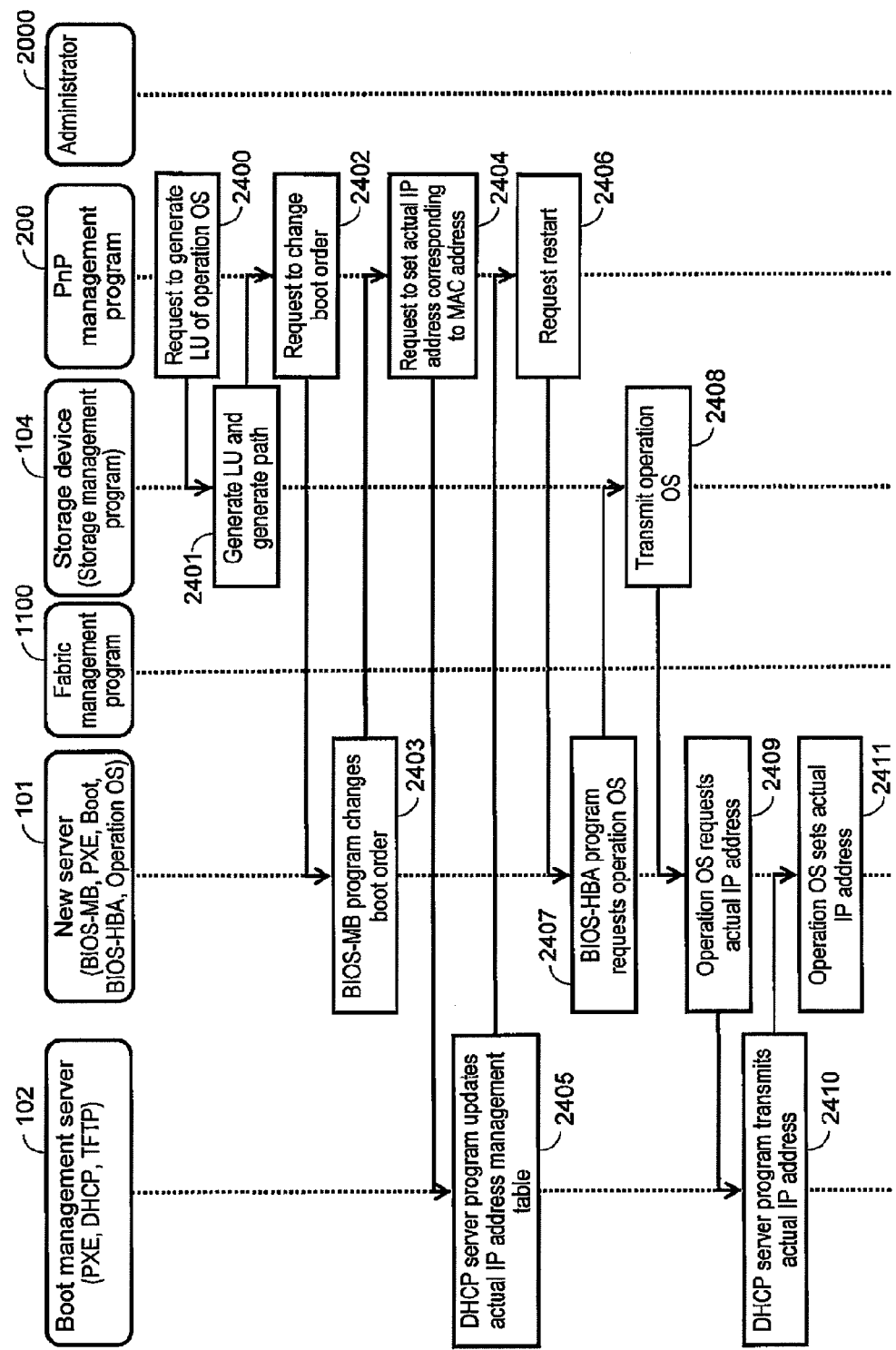
FIG. 24 is a flowchart for describing an operation OS boot process according to the first embodiment.

FIG. 24 is a flowchart (an example) for describing the details of the operation OS boot process in the first embodiment. This process basically relates to a SAN boot executed via the SAN 150.

The PnP management program 200 requests the storage management program 1301 to generate an LU of an operation OS via the LAN 150 (step 2400). At this point, the PnP management program 200 transmits the WWN of the new server 101 to the storage device 104.

The storage management program 1301 generates a logical copy of the operation OS (the LU) in the storage device 104 and updates the LUN management table 1303 (step 2401). The storage management program 1301 also determines the host LUN 1602, generates a path from the received WWN, and updates the path management table 1304 (see FIG. 16). At this point, zoning of the SNW connection devices 105 may be set as appropriate.

The PnP management program 200 requests the BIOS-MB program 800 to change the boot order (step 2402). At this point, the PnP management program 200 transmits the WWN of the SNW I/F 1600 for the generated path and the host LUN to the new server 101.

The BIOS-MB program 800 of the new server 101 updates the boot order management table 803 so that a SAN boot is executed (step 2403). That is, the table in FIG. 9A is changed into the table in FIG. 9B. The BIOS-MB program 800 also requests the BIS-HBA program 801 to register the SAN boot information. The BIOS-HBA program 801 registers the SAN boot information in the SAN boot management table 804.

The PnP management program 200 determines a permanent IP address to be assigned to the new server 101 and updates the IP address pool management table 203 (step 2404). The PnP management program 200 transmits the MAC address and the permanent IP address of the new server 101 to the DHCP server (the boot management server 102) and requests registration of the permanent IP address.

The DHCP server program 601 registers the received information in the IP address management table 604 (step 2405).

The PnP management program 200 of the resource management server 103 issues a restart request to the boot program 603 of the new server 101 (step 2406).

Once the boot program 603 in the new server 101 restarts the new server 101, the BIOS-HBA program 801 of the new server 101 refers to the registered SAN boot management table 804 to request to read the operation OS (the LU) from the storage device 104 (step 2407).

The storage management program 1301 refers to the path management table 1304 and the LUN management table 1303 to realize the reading of the operation OS (the LU) (step 2408).

The operation OS started in the new server 101 requests the DHCP server program 601 of the boot management server 102 to transmit the permanent IP address (a static IP address) (step 2409).

The DHCP server program 601 refers to the IP address management table 604 to transmit the permanent IP address to the new server 101 (step 2410).

The operation OS of the new server 101 sets the permanent IP address (step 2411). Thus, the new server 101 is ready to start communication. The process in steps 2410 and 2411 corresponds to the process in 1902 in FIG. 19.

Through performing the above process, the administrator can cause a SAN boot to be automatically set only by connecting the new server 101 to the SNW connection device 105 and powering up the new server 101 after performing the preliminary process. This provides an effect of the ability to reduce the administrator's operational errors.

In addition, the computer system detects a wrong connection made when the administrator connects the new server 101 to the SNW connection device 105, and notifies the administrator of the wrong connection. This provides an effect of the ability to lighten the administrator's task of checking for a wrong connection.

(2) Second Embodiment

The second embodiment relates to a process of automating a SAN boot in a configuration without the boot management server 102. Configurations, tables, and processes not described below are similar to those in the first embodiment.

<Configuration of Computer System>

Figure 25:
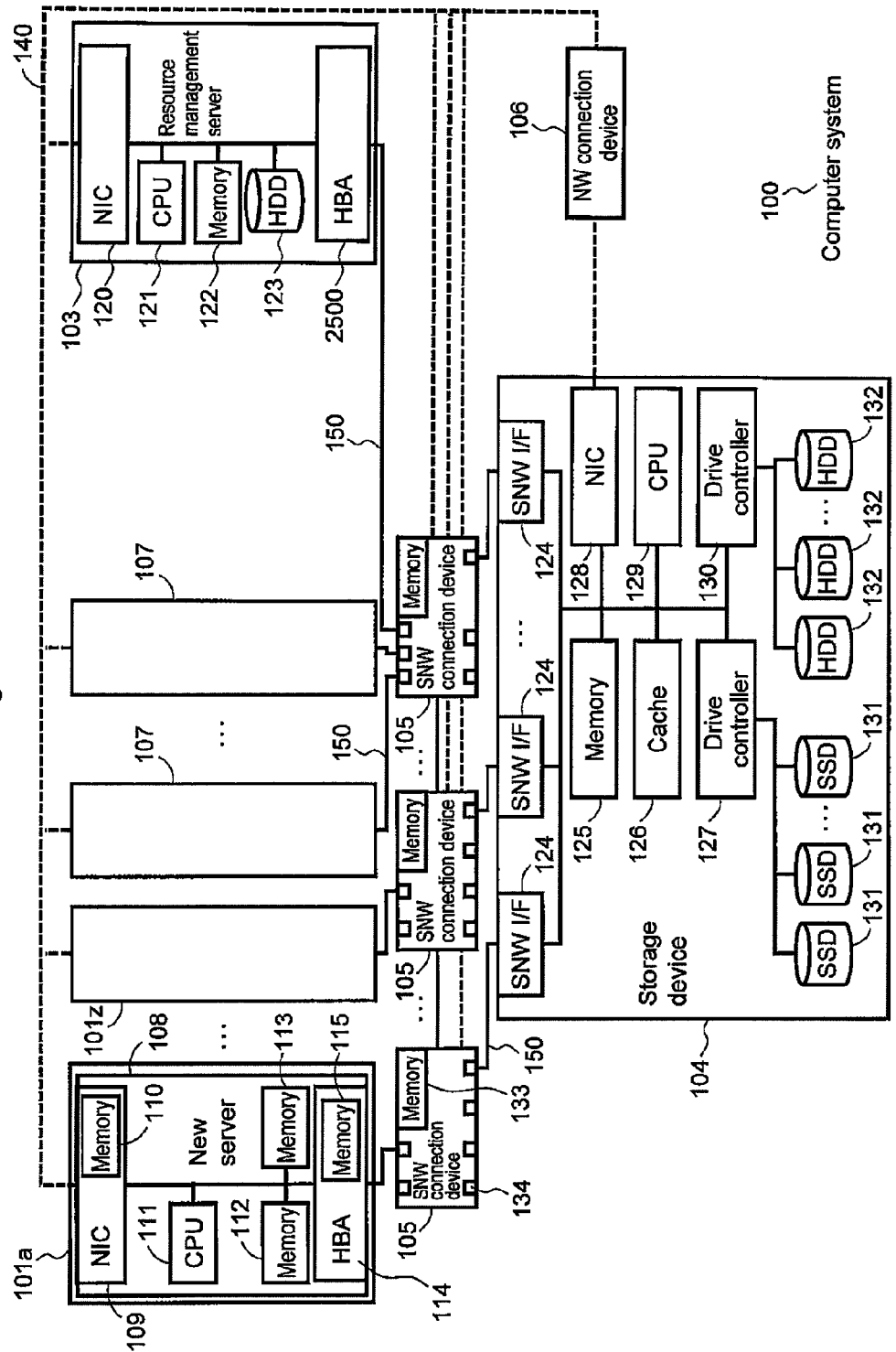
FIG. 25 is a diagram showing a schematic configuration of a computer system (a storage system) according to the second embodiment.

FIG. 25 is a diagram showing an exemplary schematic configuration of the computer system 100 in the second embodiment. In the computer system 100 in the second embodiment, unlike the first embodiment, the boot management server 102 is not provided. Instead, an HBA 2500 is provided in the resource management server 103.

The HBA 2500 uses fiber channel cables (the SAN 150) to transmit and receive data to and from the SNW connection devices 105, and the storage device 104 connected via the SNW connection devices 105.

<Logical Configuration in Resource Addition Process>

Figure 26:
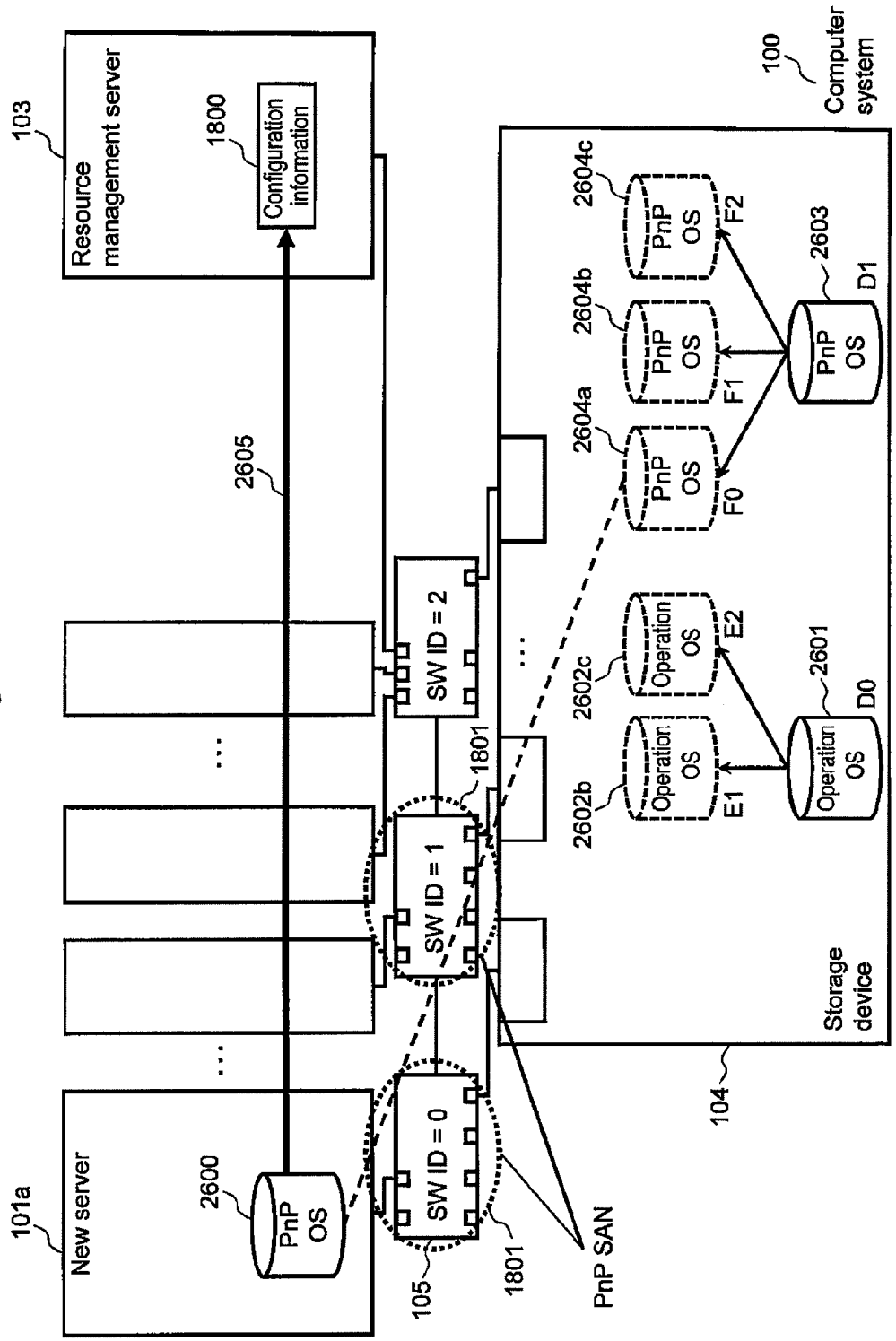
FIG. 26 is a diagram for describing a logical configuration in adding a resource according to the second embodiment.

FIG. 26 is a diagram showing an exemplary logical configuration in the resource addition process (the concept of the resource addition process) in the second embodiment.

A PnP OS 2600 represents a PnP OS 2604a detected (read) by the new server 101a.

In FIG. 26, an operation OS 2601 is an OS (an LU) to be started by the new server 101a in a SAN boot. The operation OS 2601 is a copy source of logical copies.

Operation OSs 2602 are logical copies of the operation OS 2601.

A PnP OS 2603 is a program (a boot program) for transmitting the configuration information 1800 on the new server 101a to the resource management server 103. The PnP OS 2603 is a copy source of logical copies held in the storage device 104.

PnP OSs 2604 are logical copies of the PnP OS 2603. The PnP Os 2603 holds the IP address of the resource management server 103.

The new server 101a starts by detecting (reading) a PnP OS 2604a that is a logical copy generated by the storage device 104, and transmits the configuration information 1800 to the resource management server 103 (2605).

Thus, the boot program exists in the storage device 104, so that the new server 101 reads this boot program to execute a LAN boot.

<Logical Configuration in Permanent IP address Acquisition Process>

Figure 27:
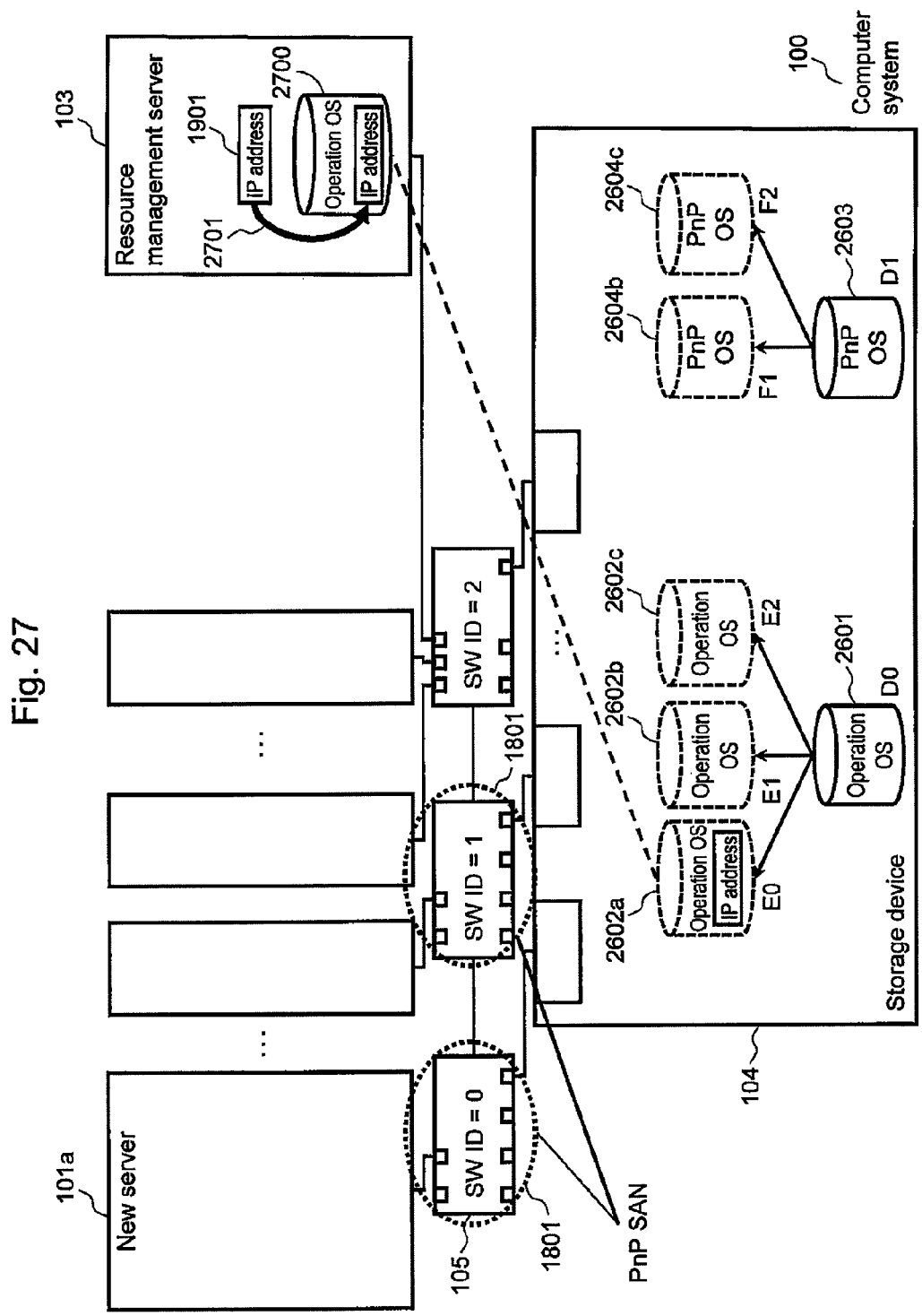
FIG. 27 is a diagram for describing a logical configuration in acquiring a permanent IP address according to the second embodiment.

FIG. 27 is a diagram showing an exemplary schematic configuration in the permanent IP address acquisition process (the concept of the permanent IP address acquisition process) in the second embodiment.

In FIG. 27, an operation OS 2700 is an operation OS 2602a detected (read) by the resource management server 103 from the storage device 104.

The resource management server 103 stores the IP address 1901 in the mounted operation OS 2700, and makes a setting so that this IP address can be used for communication when the new server 101a is started (2701).

Thus, in this process, before the new server 101a is SAN-booted, the resource management server 103 temporarily mounts the operation OS and writes (sets) the IP address to the mounted OS. In this manner, it is determined which volume (LU) uses which IP address.

<Logical Configuration of Operation OS Boot Process>

Figure 28:
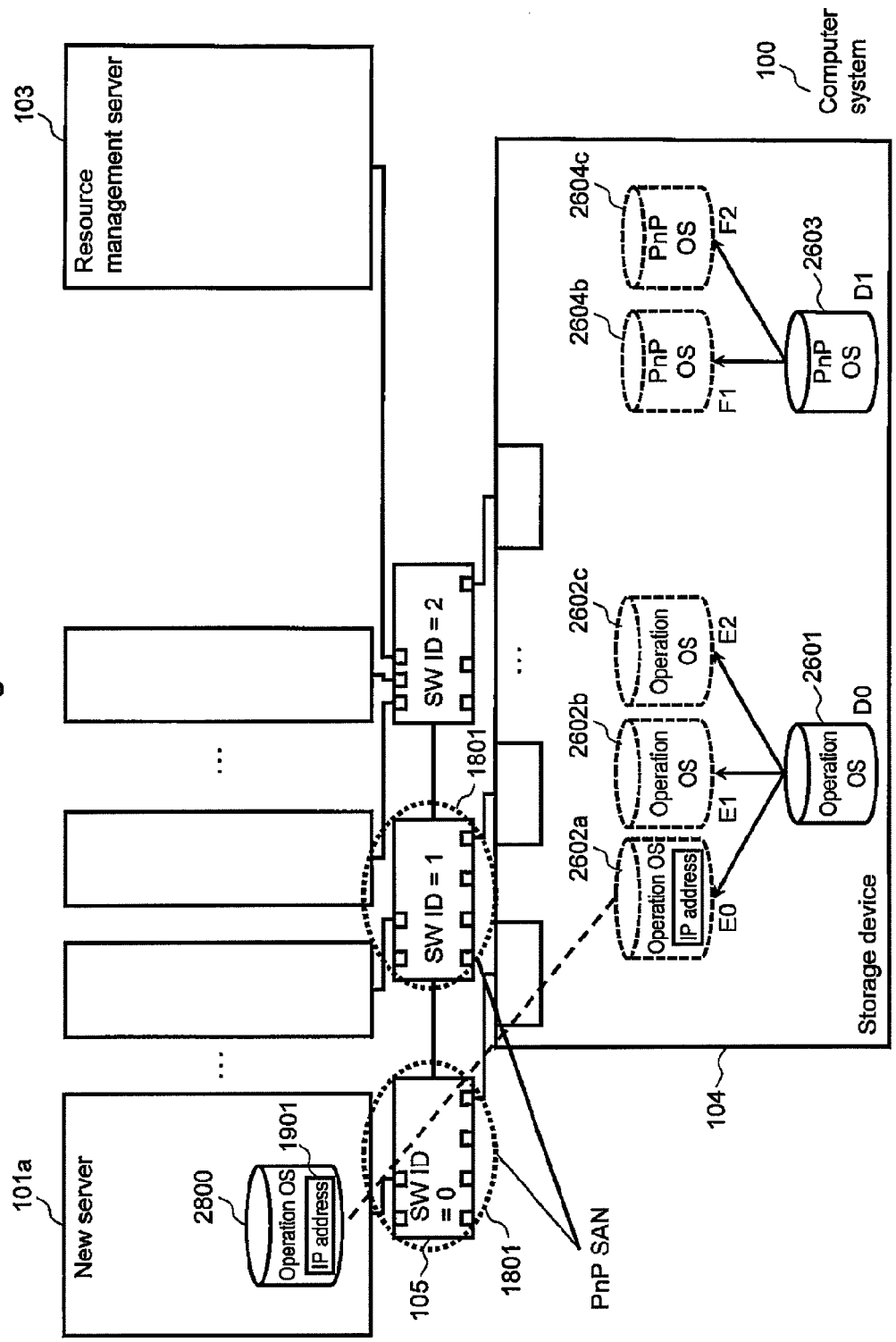
FIG. 28 is a diagram for describing a logical configuration in starting an operation OS according to the second embodiment.

FIG. 28 is a diagram showing an exemplary logical configuration in the operation OS boot process (the concept of the operation OS boot process) in the second embodiment.

In FIG. 28, an operation OS 2800 is the operation OS 2602a detected (read) by the new server 101a. Since the LUN and the new server (host) are associated with each other by the WWN, the operation OS and an IP address are read according to the association. The IP address is information necessary for the new server 101a to function as a host.

When the new server 101a starts, the new server 101a is ready to perform communication with the set IP address 1901.

<Details of Resource Addition Process>

Figure 29:
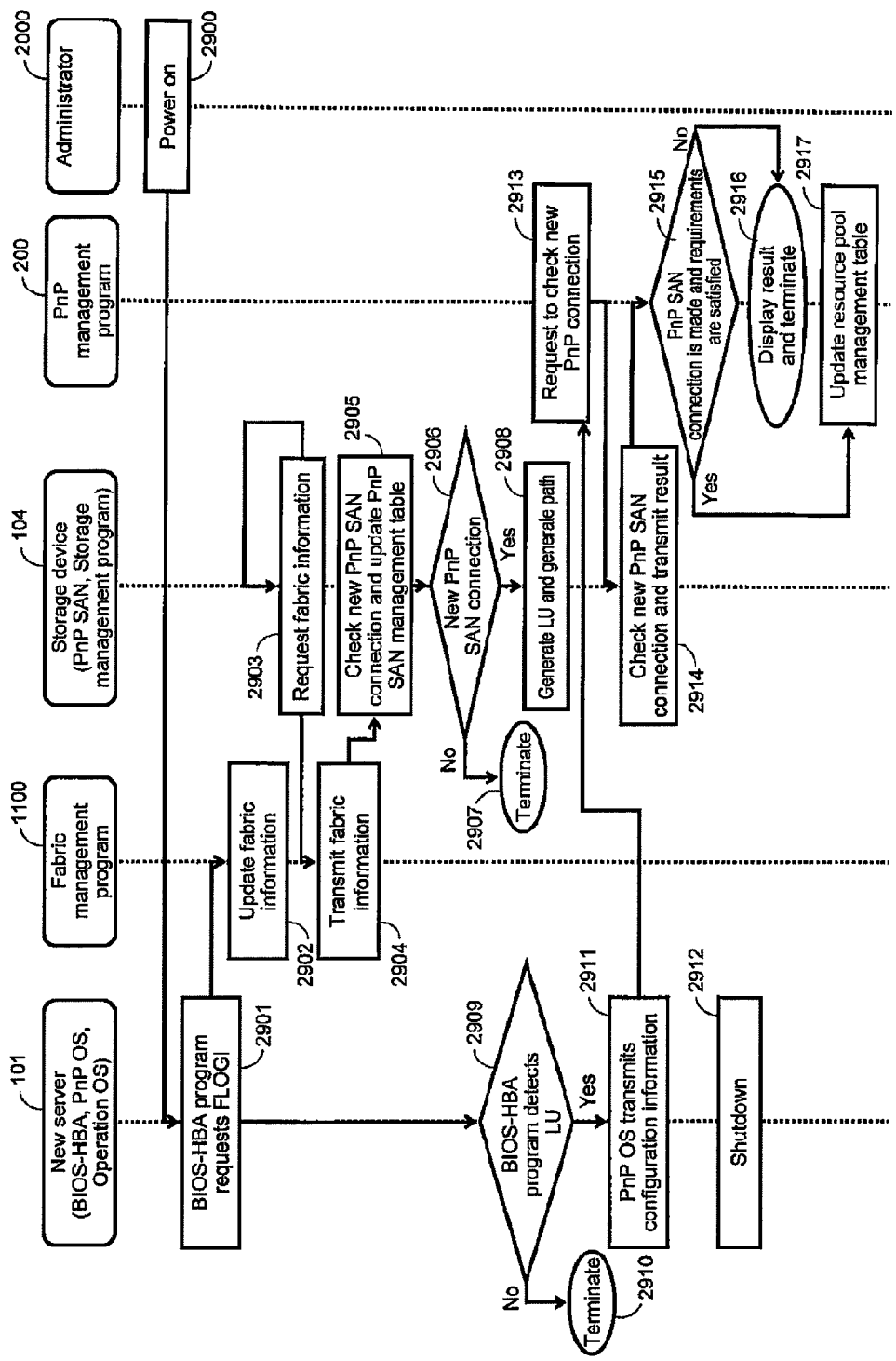
FIG. 29 is a flowchart for describing a resource addition process according to the second embodiment.

FIG. 29 is a flowchart (an example) for describing the details of the resource addition process in the second embodiment. In the second embodiment, the flow of the general outline of the processes is similar to that of FIG. 17 as described above. Description of the preliminary process 1700 is omitted.

The administrator 2000 connects the new server 101a to the SNW connection device 105 and powers up the new server 101a (step 2900). It is assumed here that the server to be newly added is the new server 101a, and other servers are already connected to the SNW connection device 105.

The BIOS-HBA program 801 of the new server 101a issues a request for FLOGI (Fabric Login) to the fabric management program 1100 (step 2901).

The fabric management program 1100 receives the FLOGI request and updates the fabric management table 1101 (FIG. 12) (step 2902). Thus, the new connection is added to the fabric management table 1101.

The PnP SAN management program 1300 of the storage device 104 regularly requests the fabric management program 1100 to transmit fabric information (step 2903). Here, "regularly" means arbitrary timing, including periodical timing and an administrator-set time.

The fabric management program 1100 obtains the fabric information from the fabric management table 1101 and transmits the obtained fabric information to the PnP SAN management program 1300 (step 2904).

The PnP SAN management program 1300 compares the received fabric information with the information in the PnP SAN management table 1302 to determine whether the WWN of the HBA 114 as an initiator (a new server) has been newly added to the fabric. If added, the PnP SAN management program 1300 updates the PnP SAN management table 1302 (step 2905). The result of this new WWN determination is represented as "Yes" if the WWN has been newly added, or "No" otherwise. The PnP SAN management program 1300 holds the WWN of the HBA 114 and the new WWN determination result in the memory 125 of the storage device 104.

Further, the PnP SAN management program 1300 determines whether or not the new WWN determination result is "Yes" (step 2906). If the determination result is "Yes," the process transitions to step 2908. If the determination result is not "Yes," the process transitions to step 2907.

If the determination result is not "Yes," the PnP SAN management program 1300 terminates the resource addition process related to this program and enters a waiting mode (step 2907).

If the determination result is "Yes," the storage management program 1301 generates a logical copy of the PnP OS (the LU) and updates the LUN management table 1303 (step 2908). That is, the storage management program 1301 determines the host LUN 1602, generates a path from the WWN of the HBA 114, and updates the path management table 1304.

The BIOS-HBA program 801 regularly (with arbitrary timing) searches for an LU provided by the storage device 104 and determines whether an LU has been detected or not (read or not) (step 2909). The BIOS-HBA program 801 is configured to execute a boot starting from a detected LU corresponding to a target host LUN of 0. If an LU is detected, a process in step 2911 is performed. If an LU is not detected within a certain period of time or within a certain number of searches, the process transitions to step 2910.

The BIOS-HBA program 801 terminates the resource addition process related to this program and transmits a notification of the failure of detecting a bootable LU to the BIOS-MB program 800 (step 2910). The BIOS-MB program 800 refers to the boot order management table 803 to process a boot starting from the next device.

The PnP OS refers to the IP address of the resource management server 103 to transmit the server configuration information to the PnP management program 200 (step 2911). After the transmission, the new server 101 shuts down (step 2912).

The PnP management program 200 of the resource management server 103 holds the configuration information in the memory 122 and requests the PnP SAN management program 1300 to check the PnP connection (check whether or not the new server is connected to the PnP SAN) (step 2913). At this point, the PnP management program 200 transmits the WWN in the obtained configuration information to the PnP SAN management program 1300.

The PnP SAN management program 1300 of the storage device 104 determines whether or not the new WWN determination result matches the WWN received from the PnP management program 200 (step 2914). This will hereinafter be referred to as PnP SAN determination. If the WWNs are the same, the PnP SAN management program 1300 determines that the new server 101 having the HBA corresponding to that WWN is PnP-connected. The PnP SAN management program 1300 transmits the result of this PnP SAN determination to the PnP management program 200. The PnP SAN determination result is represented as "Yes" if the server is connected to the PnP SAN, or "No" otherwise.

The PnP management program 200 refers to the resource requirement management table 202 and the received PnP SAN determination result. If the resource requirements are satisfied and the PnP SAN determination result is "Yes," the process transitions to step 2917 (step 2915). Otherwise, the process transitions to step 2916.

In step 2916, the PnP management program 200 displays, on a GUI (not shown), whether the resource requirements are satisfied and the PnP SAN determination result, along with the server configuration information on the new server 101 including the WWN. The administrator 2000 can check this display to see whether a wrong connection has been made. This display also shows the date and time when the new server 101 was detected, and a history of previously detected new servers 101. In this manner, the administrator 2000 can know how many servers were erroneously connected among recently added new servers.

In step 2917, the PnP management program 200 registers, in the resource pool management table 201, the configuration information that has been held. At this point, as in step 2313, the PnP management program 200 displays information on the new server 101 added to the resource pool so that the administrator 2000 can check the information.

<Details of Operation OS Boot Process>

Figure 30:
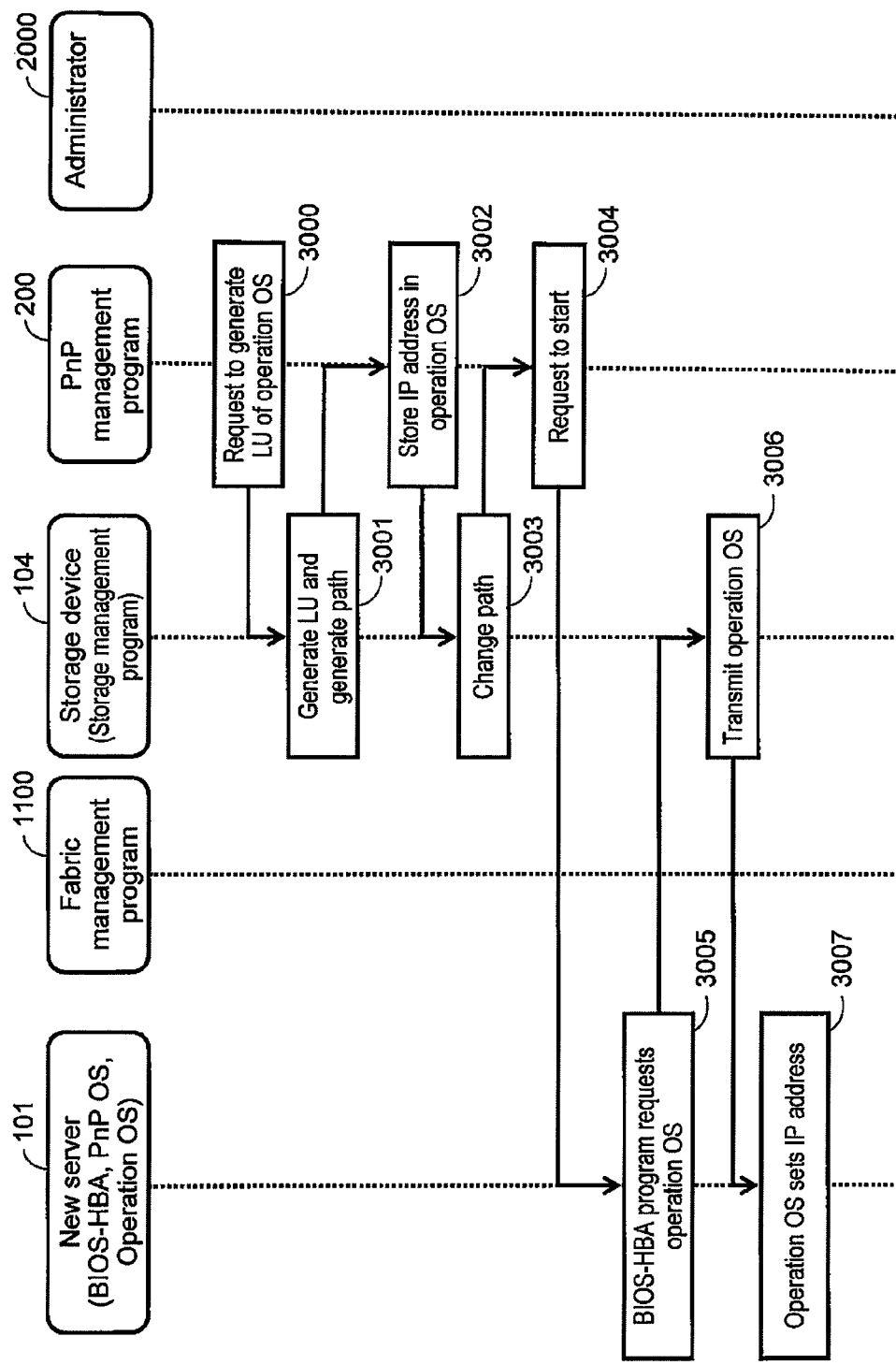
FIG. 30 is a flowchart for describing an operation OS boot process according to the second embodiment.

FIG. 30 is a flowchart (an example) for describing the details of the operation OS boot process in the second embodiment.

The PnP management program 200 requests the storage management program 1301 to generate an LU of an operation OS (step 3000). At this point, the PnP management program 200 transmits the WWN of the HBA 2500.

The storage management program 1301 generates a logical copy of the operation OS (the LU) and updates the LUN management table 1303 (step 3001). That is, the storage management program 1301 determines the host LUN 1602, generates a path from the received WWN, and updates the path management table 1304. The storage management program 1301 also deletes the path setting made in step 2908 (see FIG. 29) from the path management table 1304. The storage management program 1301 also deletes the logical copy of the PnP OS generated in step 2908 and updates the LUN management table 1303.

The PnP management program 200 detects (reads) the host LUN 1602 that is provided by the storage device 104 and is set in step 3001, and mounts the operation OS. The PnP management program 200 determines an IP address to be assigned to the new server 101 and updates the IP address pool management table 203. The PnP management program 200 stores the IP address in the mounted operation OS and makes a setting so that this IP address can be used for communication upon boot. After unmounting the operation OS, the PnP management program 200 requests the storage management program 1301 to change the path. At this point, the PnP management program 200 transmits the WWN of the HBA 114 (step 3002). The process from steps 3000 to 3002 corresponds to FIG. 27 (the permanent IP address acquisition process).

The storage management program 1301 deletes the path setting made in step 3001 from the path management table 1304 (step 3003). The storage management program 1301 determines the host LUN 1602, generates a path from the received WWN, and updates the path management table 1304.

The PnP management program 200 issues a boot requests to the PnP OS of the new server 101 (step 3004).

Once the PnP OS (the boot program) starts the new server 101, the BIOS-HBA program 801 issues a request for reading the operation OS from the storage device 104 to the detected LU corresponding to a host LUN of 0 (step 3005).

The storage management program 1301 refers to the path management table 1304 and the LUN management table 1303 to transmit the operation OS along with the IP address to the new server 0 (step 3006).

When the new server 101 starts, the new server 101 is ready to start communication with the set IP address 1901 (step 3007). The process from steps 3003 to 3007 corresponds to FIG. 28 (the process in starting the operation OS).

Through performing the above process, even in a configuration without the boot management server 102, the administrator can cause a SAN boot to be automatically set only by connecting the new server 101 to the SNW connection device 105 and powering up the new server 101 after performing the preliminary process. This provides an effect of the ability to reduce the administrator's operational errors. In addition, the computer system detects a wrong connection made when the administrator connects the new server 101 to the SNW connection device 105, and notifies the administrator of the wrong connection. This provides an effect of the ability to lighten the administrator's task of checking for a wrong connection. Also, the boot management server 102 is not necessary, and this provides an effect of the ability to reduce potentially faulty components in the computer system 100 and to provide the computer system 100 of higher reliability.

(3) Variations

In the above embodiments, the PnP SAN management program 1300, which determines whether or not the new server 101 has been connected to the PnP SAN, runs in the storage device 104. Alternatively, the PnP SAN management program 1300 may be in a server such as the resource management server 103 or in the SNW connection device 105. If the PnP SAN management program 1300 runs in the storage device 104, the influence on the network communication band can be effectively reduced by continuously performing the process.

In the above embodiments, the resource addition process and the operation OS boot process are successively performed. Alternatively, the new server 101 may be pooled in the resource addition process, and the operation OS boot process may be performed when the computer system 100 enters a specific state. Here, an example of the specific state may be as follows: when the load on a group of servers forming a cluster increases and exceeds a threshold, the operation OS boot process may be performed for the purpose of load distribution by adding the new server 101 for an operation OS to the cluster. At this point, the operation OS 1802 as the logical copy source may be selectable according to the operation OS forming the cluster or according to the server configuration information.

Further, although only one type of operation OS is used in the above embodiments, the operation OS 1802 as the logical copy source may be selectable according to the resource requirements.

In the above embodiments, the PnP SAN management program 1300 requests the fabric information from the fabric management program 1100. Alternatively, when the fabric management program 1100 detects a change in a state such as the FLOGI state, the fabric management program 1100 may notify the PnP SAN management program 1300 of the changed information through means such as RSCN. In this manner, steps 2309 and 2903 can be skipped. This provides an effect of the ability to reduce the influence of the PnP SAN management program 1300 on the network communication band, and to reduce the amount of processing of the fabric management program 1100.

In the above embodiments, the PnP SAN is set on the basis of the SNW connection devices 105. Alternatively, the PnP SAN may be set on the basis of a physical configuration forming the SAN, such as the ports 134 of the SNW connection devices 105, the SNW I/Fs 124 of the storage device 104, or the storage device 104, or on the basis of a logical configuration such as the fabric (SAN), the zoning that is set by the SNW connection devices 105, or the like.

Any entries may be used for the resource configuration requirements as long as relevant information can be obtained from the servers. Determinations whether or not the requirements are satisfied may be based on whether a value is "equal to," "not smaller than," "not larger than," or "smaller than" the value of a requirement, or may be based on an operation such as "NOT" of a requirement entry, or "AND" or "OR" between requirement entries.

Further, although the PnP SAN is set in the above embodiments, a SAN boot can be automated without setting the PnP SAN. In that case, other measures for preventing a wrong connection of the new server 101 to the SNW connection device 105 are necessary.

(4) Conclusion

In the embodiments of the present invention, at least one SNW connection device operates as a PnP SAN connection device for executing a SAN boot. A new server connected to the PnP SAN connection device transmits configuration information on the new server to a resource management server. A storage subsystem (a storage device) obtains property information on the PnP SAN connection device with reference to PnP SAN management information (SAN type information) for managing information on servers connected to SNW connection devices, and transmits the property information to the resource management server. The resource management server determines whether to add the new server as a resource pool on the basis of configuration requirements (e.g., which are set and input by an administrator, or held in advance as requirement setting information) required for a server to be a target to execute a SAN boot, the obtained property information, and the configuration information on the new server, and presents (displays on a display screen) the information about the determination. In this manner, after the administrator presets resource pool requirements, a PnP SAN for each SNW connection device, and an IP address pool, the administrator can cause the SAN boot to be automatically set to make the new server available only by connecting the new server to the SNW connection device and powering up the new server. Thus, the administrator's operational errors can be effectively reduced.

The new server registered as the resource pool, and the storage subsystem cooperate to execute the SAN boot and set a logical storage area (an LU) in the storage subsystem to be available to the new server. In this manner, the SAN boot can be automatically set with a reduced amount of the administrator's operations. Therefore, the administrator's operational errors can be prevented, and the efficiency of the administrator's operations can be increased.

The computer system has a boot management server that holds a boot program. The new server obtains the boot program from the boot management server and executes the boot program. In this manner, the need to install the boot program into each new server is eliminated. Each new server can be started to transmit the configuration information on the new server to the resource management server in a common manner. Therefore, efficient system operation can be achieved.

The resource management server obtains fabric information indicating information on devices (servers and storage devices) connected to each SNW connection device. In response to selection made by the administrator for setting the PnP SAN connection device, the resource management server sets the PnP SAN connection device and presents information on the set PnP SAN connection device. In this manner, if a device that should not be connected to the PnP SAN connection device is connected to the PnP SAN connection device, the wrong connection can be readily detected.

In the storage device, the fabric information is obtained and held as the PnP SAN management information (the SAN type information). In the PnP SAN management information, the SNW connection device that is set as the PnP SAN connection device is managed. In this manner, when the server and the storage device cooperate to execute the SAN boot, it is easy to manage which SNW connection device has connected thereto a device to be SAN-booted.

The PnP SAN connection device updates the fabric information in response to connection of a newly added server. The resource management server determines whether the newly added server satisfies the configuration requirements and determines whether to add the newly added server to the resource pool. In this manner, it is automatically determined whether or not the server is added to the resource pool. Therefore, the administrator's task can be eliminated, and a case such that a server that should not be added to the resource pool is erroneously added can be avoided. The storage device obtains the fabric information and updates the PnP SAN management information to include the newly added server into the information on devices connected to the PnP SAN connection devices. Thus, the PnP SAN management information can be automatically updated, so that the task of checking the storage device can be reduced.

The storage device may hold the boot program in place of the boot management server. In this case, the new server obtains the boot program from the storage device, executes the boot program, and transmits the configuration information on the new server to the resource management server. In this manner, the boot management server can be eliminated.

The present invention may also be implemented by program code of software realizing the functions of the embodiments, where a system or apparatus is provided with a storage medium having the program code recorded thereon, and a computer (or a CPU or MPU) of the system or apparatus reads out the program code stored in the storage medium. In this case, the program code itself read out from the storage medium realizes the functions of the above-described embodiments, and therefore the program code itself and the storage medium having the program code stored thereon constitute the present invention. Examples of the storage medium for supplying such program code include a flexible disk, a CD-ROM, a DVD-ROM, a hard disk, an optical disk, a magneto-optical disk, a CD-R, a magnetic tape, a nonvolatile memory card, and a ROM.

The functions of the above-described embodiments may be realized by causing an OS (operating system) or the like running on a computer to perform part or all of the actual processing based on instructions of the program code. Further, the functions of the above-described embodiments may be realized by writing the program code read out from the storage medium into memory on a computer and then causing a CPU or the like of the computer to perform part or all of the actual processing based on instructions of the program code.

Further, the program code realizing the functions of the embodiments may be distributed via a network and stored in storage means such as a hard disk or memory of a system or apparatus or on a storage medium such as a CD-RW or CD-R, and a computer (or a CPU or MPU) of the system or apparatus may read out and execute the program code stored in the storage means or storage medium when using the program code.

Lastly, it is to be understood that the processes and techniques described herein substantially do not relate to any particular devices and may be implemented in any appropriate combinations of components. Further, various types of general-purpose devices may be used according to the teachings described herein. It may become apparent that constructing a special-purpose device is beneficial for performing the steps of the method described herein. Appropriate combinations of the elements disclosed in the embodiments may be used to form various inventions. For example, some elements may be deleted from all the elements illustrated in the embodiments. Further, elements across different embodiments may be combined as appropriate. Although the present invention has been described in relation to the specific examples, these examples are not for limiting but for illustration in all respects. Those skilled in the art will realize that there are many combinations of hardware, software, and firmware suitable for implementing the present invention. For example, the described software may be implemented in a wide range of program or script languages, such as assembler, C/C++, perl, Shell, PHP, and Java (R).

Further, the above-described embodiments show control lines and information lines considered as necessary for illustration, and do not necessarily show all control lines and information lines for a product. All configurations may be interconnected.

In addition, for those having general knowledge in the technical field, other implementations of the present invention will become apparent from the discussion in this specification and the embodiments of the present invention disclosed herein. Various aspects and/or components of the described embodiments may be used alone or in any combination in a computerized storage system having a data management capability. This specification and the specific examples are only representative, and the scope and spirit of the present invention are set forth in the following claims.

REFERENCE SIGNS LIST 100 computer system
101 new server
102 boot management server
103 resource management server
104 storage device
105 SNW connection device
106 NW connection device
107 server (including existing server)
140 LAN
150 SAN

The invention claimed is:

1. A computer system comprising: a plurality of computers;
a resource management computer that manages configuration information on the computers;
a storage subsystem for storing data;
a network that couples the plurality of computers with each other and couples the plurality of computers with the storage subsystem; and
a plurality of SNW connection devices that couple at least one of the plurality of computers with the storage subsystem via a SAN, wherein at least one of the SNW connection devices operates as a PnP SAN connection device for executing a SAN boot, a first computer coupled with the PnP SAN connection device transmits the configuration information on the first computer to the resource management computer, the storage subsystem obtains property information on the PnP SAN connection device with reference to SAN type information for managing information on computers coupled with the plurality of SNW connection devices, and transmits the property information to the resource management computer, the resource management computer determines whether or not to set the first computer as a target to execute the SAN boot on the basis of information on a configuration requirement required for a computer to be a target to execute the SAN boot, the property information, and the configuration information, and, according to a result of the determination, manages the first computer as a target to execute the SAN boot and presents information on the target to execute the SAN boot, the resource management computer obtains fabric information indicating information on devices connected to each SNW connection device from the plurality of SNW connection devices and, in response to an instruction to set the PnP SAN connection device, sets the PnP SAN connection device and presents information on the set PnP SAN connection device, the storage subsystem obtains the fabric information and holds the fabric information as theSAN type information, and manages the SNW connection device set as the PnP SAN connection device in the SAN type information, and the PnP SAN connection device updates the fabric information in response to connection of a newly added computer, the resource management computer determines whether the newly added computer satisfies the configuration requirement and determines whether to include information on the newly added computer into targets to execute the SAN boot, and the storage subsystem includes the information on the newly added computer into information on devices connected to the PnP SAN connection device in the SAN type information.

2. A computer system according to claim 1, wherein the first computer and the storage subsystem cooperate to execute the SAN boot and set a logical storage area in the storage subsystem to be available to the first computer.

3. A computer system according to claim 1, wherein at least one of the plurality of computers operates as a boot management computer holding a boot program that performs a process for transmitting the configuration information on the first computer to the resource management computer, and the first computer obtains the boot program from the boot management computer via the network and executes the boot program.

4. A computer system according to claim 1, wherein the storage subsystem holds a boot program that performs a process for transmitting the configuration information on the first computer to the resource management computer, and the first computer obtains the boot program from the storage subsystem and executes the bootprogram, and transmits the configuration information to the resource management computer.

5. A method in a computer system for managing information on a resource pool indicating a plurality of computers configurable to execute a SAN boot, the computer system comprising:

a plurality of computers;

a resource management computer that manages configuration information on the computers;

a storage subsystem for storing data; and a plurality of connection devices that couple at least one of the plurality of computers with the storage subsystem via a SAN, the method comprising the steps of:

the resource management computer, in response to an input setting request, setting at least one of the plurality of connection devices to operate as a SAN-booting connection device forexecuting the SAN boot;

a first computer coupled with the SAN-booting connection device transmitting the configuration information on the first computer to the resource management computer;

the storage subsystem obtaining property information on the SAN-booting connection device with reference to SAN type information for managing information on computers coupled with the plurality of connection devices, and transmitting the property information to the resource management computer;

the resource management computer determining whether or not to set the first computer as a target to execute the SAN boot on the basis of information on a configuration requirement required for a computer to be a target to execute the SAN boot, the property information, and the configuration information;

the resource management computer adding the first computer to the resource pool as a target to execute the SAN boot and presenting information on the resource pool according to a result of the determination the resource management computer obtaining fabric information indicating information on devices connected to each connection device from the plurality of connection devices;

the resource management computer setting the SAN-booting connection device and presenting information on the set SAN-booting connection device in response to an instruction to set the SAN-booting connection device;

the storage subsystem obtaining the fabric information and holding the fabric information asthe SAN type information, and managing the connection device set as the SAN-booting connection device in the SAN type information;

the SAN-booting connection device updating the fabric information in response to connection of a newly added computer;

the resource management computer determining whether the newly added computer satisfies the configuration requirement and determining whether to include information on the newly added computer into the information on the resource pool; and the storage subsystem including the information on the newly added computer into information devices connected to the SAN-booting connection device in the SAN type information.

6. A method according to claim 5, further comprising the steps of:

the first computer and the storage subsystem cooperating to execute the SAN boot; and the storage subsystem setting a logical storage area in the storage subsystem to be available to the first computer.

7. A method according to claim 5, wherein
at least one of the plurality of computers operates as a boot management computer holding a boot program that performs a process for transmitting the configuration information on the first computer to the resource management computer, the method further comprising the step of the first computer obtaining the boot program from the boot management computer and executing the boot program.

8. A method according to claim 5, wherein
the storage subsystem holds a boot program that performs a process for transmitting the configuration information on the first computer to the resource management computer,
the method further comprising the step of
the first computer obtaining the boot program from the storage subsystem and executing the boot program, and transmitting the configuration information to the resource management computer.

* * * * *